(12) United States Patent
Wallis et al.

(10) Patent No.: US 7,516,056 B2
(45) Date of Patent: Apr. 7, 2009

(54) APPARATUS, METHOD AND SYSTEM FOR IMPROVED RESERVOIR SIMULATION USING A MULTIPLICATIVE OVERLAPPING SCHWARZ PRECONDITIONING FOR ADAPTIVE IMPLICIT LINEAR SYSTEMS

(75) Inventors: John Wallis, Houston, TX (US); Hamdi A. Tchelepi, San Mateo, CA (US); Hui Cao, Sugar Land, TX (US)

(73) Assignee: Schlumberger Technology Corporation, Houston, TX (US)

( * ) Notice: Subject to any disclaimer, the term of this patent is extended or adjusted under 35 U.S.C. 154(b) by 359 days.

(21) Appl. No.: 11/410,622

(22) Filed: Apr. 25, 2006

(65) Prior Publication Data

US 2006/0265204 A1 Nov. 23, 2006

Related U.S. Application Data

(60) Provisional application No. 60/674,936, filed on Apr. 26, 2005.

(51) Int. Cl.
*G06F 9/455* (2006.01)
(52) U.S. Cl. .......................... 703/10; 702/11
(58) Field of Classification Search ................ 703/10, 703/6; 702/11
See application file for complete search history.

(56) References Cited

U.S. PATENT DOCUMENTS 6,052,520 A * 4/2000 Watts, III ............... 703/10

| | | | | |
|---|---|---|---|---|
| 6,662,146 B1 * | 12/2003 | Watts | ................. | 703/10 |
| 6,810,370 B1 * | 10/2004 | Watts, III | ............... | 703/10 |
| 2003/0028325 A1 * | 2/2003 | Roggero et al. | ............... | 702/11 |
| 2005/0065759 A1 * | 3/2005 | Barroux | ................. | 703/10 |
| 2005/0171751 A1 * | 8/2005 | Siebrits et al. | ............... | 703/10 |

(Continued)

FOREIGN PATENT DOCUMENTS

WO 01/40937 6/2001

OTHER PUBLICATIONS

Peaceman, D., "Fundamentals of Numerical Reservoir Simulation", Elsevier Scientific Publishing Company, 1977, 39 pages.

(Continued)

*Primary Examiner*—Paul L Rodriguez
*Assistant Examiner*—Kandasamy Thangavelu
(74) *Attorney, Agent, or Firm*—Robert P. Lord; Jim Patterson; Bryan P. Galloway

(57) ABSTRACT

A method, system and apparatus are disclosed for conducting a reservoir simulation, using a reservoir model of a gridded region of interest. The grid of the region of interest includes one or more types of cells, the type of cell being distinguished by the number of unknown variables representing properties of the cells. The cells share a common variable as an unknown variable. The method includes the steps of identifying different cell types for the grid; constructing an overall matrix for the reservoir model based on the different cell types; at least partially decoupling the common variable from the other unknown variables in the matrix by using a reduction process to yield a reduced matrix; mathematically breaking up the variables in the reduced matrix into k subsets by cell types; applying an overlapping multiplicative Schwartz procedure to the reduced matrix to obtain a preconditioner and using the preconditioner to solve for the unknown variables.

52 Claims, 14 Drawing Sheets

U.S. PATENT DOCUMENTS

| | | | |
|---|---|---|---|
| 2005/0203725 A1* | 9/2005 | Jenny et al. | 703/10 |
| 2006/0036418 A1* | 2/2006 | Pita et al. | 703/10 |
| 2006/0052938 A1* | 3/2006 | Thorne et al. | 702/11 |
| 2006/0224370 A1* | 10/2006 | Siebrits et al. | 703/10 |
| 2006/0235667 A1* | 10/2006 | Fung et al. | 703/10 |

OTHER PUBLICATIONS

Vinsome, P. K. W., "Orthomin, an Iterative method for Solving Sparse Sets of Simultaneous Linear Equations", Society of Petroleum Engineers of AIME, 1976, 11 pages.

Saad, Y., Schultz, M., "GMRES: A Generalized Minimal Residual Algorithm for Solving Non Symmetric Linear Systems", Society for Industrial and Applied Mathematics, Jul. 1986, 14 pages.

Stone, H. L., Garder, Jr., A. O., "Analysis of Gas-Cap or Dissolved-Gas Drive Reservoirs", Society of Petroleum Engineers Journal, Jun. 1961, 13 pages.

Aziz, K., Settari, A., "Petroleum Reservoir Simulation", Applied Science Publishers Ltd., 1979, 58 pages.

Coats, K. H., "IMPES Stability: Selection of Stable Timesteps", SPE Journal, Jun. 2003, 7 pages.

Thomas, G. W., Thurnau, D. H., "Reservoir Simulation Using an Adaptive Implicit Method", Society of Petroleum Engineers of AIME, Oct. 1983, 10 pages.

Coates, K. H., "A Note on IMPES and Some IMPES-Based Simulation Models", SPE Journal, Sep. 2000, 7 pages.

Wallis, J. R., Kendall, R. P., Little, T. E., "Constrained Residual Acceleration of Conjugate Residual Methods", Society of Petroleum Engineers of AIME, 1985, 14 pages.

\* cited by examiner (START FROM STEP 240 OF FIG.4) — 255

SET $$T = \begin{bmatrix} I & 0 & 0 \\ T_{qs} & I & 0 \\ T_{es} & 0 & I \end{bmatrix} \text{ WHERE}$$

$T_{qs} = -\text{colsum}(A_{qs})\text{colsum}^{-1}(A_{ss})$ AND $T_{es} = -\text{colsum}(A_{es})\text{colsum}^{-1}(A_{ss})$ AND WHERE $\text{colsum}(A_{qs})$, $\text{colsum}(A_{ss})$ AND $\text{colsum}(A_{es})$
DENOTE BLOCK DIAGONAL MATRICES— EACH DIAGONAL BLOCK IS THE SUM OF THE BLOCKS IN THE CORRESPONDING BLOCK COLUMN OF $A_{qs}$, $A_{ss}$ AND $A_{es}$ RESPECTIVELY.
AND
I IS AN IDENTITY MATRIX HAVING ONES ON THE DIAGONALS AND ZEROS ELSEWHERE

— 256

MULTIPLY BOTH SIDES OF THIS EQUATION:
$Ax = b$
BY T SO THAT $\tilde{A}x = \tilde{b}$
WHERE
$\tilde{b} = Tb$
AND REDUCED MATRIX $\tilde{A}$:
$\tilde{A} = TA$

— 257

(GO TO STEP 260 OF FIG.4) — 258

APPARATUS, METHOD AND SYSTEM FOR IMPROVED RESERVOIR SIMULATION USING A MULTIPLICATIVE OVERLAPPING SCHWARZ PRECONDITIONING FOR ADAPTIVE IMPLICIT LINEAR SYSTEMS

CROSS REFERENCE TO RELATED APPLICATION

This is a Utility Application of prior pending Provisional Application Ser. No. 60/674,936, filed on Apr. 26, 2005, entitled "Apparatus, Method and System for Improved Reservoir Simulation Using a Multiplicative Overlapping Schwarz Preconditioning for Adaptive Implicit Linear Systems."

BACKGROUND OF THE INVENTION

1. Field of the Invention

This invention relates to apparatuses, methods and systems for use in reservoir simulation. In particular, the invention provides methods, apparatuses and systems for more effectively and efficiently simulating fluid flow in reservoirs using an overlapping multiplicative Schwarz method of preconditioning adaptive implicit linear systems.

2. Background

Reservoir simulation often requires the numerical solution of the equations that describe the physics governing the complex behaviors of multi-component, multiphase fluid flow in natural porous media in the reservoir and other types of fluid flow elsewhere in the production system. The governing equations typically used to describe the fluid flow are based on the assumption of thermodynamic equilibrium and the principles of conservation of mass, momentum and energy, as described in Aziz, K. and Settari, A., *Petroleum Reservoir Simulation*, Elsevier Applied Science Publishers, London, 1979. The complexity of the physics that govern reservoir fluid flow leads to systems of coupled nonlinear partial differential equations that are not amenable to conventional analytical methods. As a result, numerical solution techniques are necessary.

A variety of mathematical models, formulations, discretization methods, and solution strategies have been developed and are associated with a grid imposed upon an area of interest in a reservoir. Detailed discussions of the problems of reservoir simulation and the equations dealing with such problems can be found, for example, in a PCT published patent application to ExxonMobil, International Publication No. WO 01/40937, incorporated herein by reference and in U.S. Pat. No. 6,662,146 B1 (the '146 patent"), incorporated herein by reference. Reservoir simulation can be used to predict production rates from reservoirs and can be used to determine appropriate improvements, such as facility changes or drilling additional wells, that can be implemented to improve production.

A grid imposed upon an area of interest in a model of a reservoir may be structured or unstructured. Such grids are comprised of cells, each cell having one or more unknown properties, but with all the cells in the grid having one common unknown variable, generally pressure. Other unknown properties may include, but are not limited to, fluid properties such as water saturation or temperature for example, or to "rock properties," such as permeability or porosity to name a few. A cell treated as if it has only a single unknown variable (typically pressure) is called herein a "single variable cell," or an "IMPES cell" while a cell with more than one unknown is called herein a "multi-variable cell" or an "implicit cell."

The most popular approaches for solving the discrete form of the nonlinear equations are the FIM (fully implicit method) and IMPES (Implicit Pressure, Explicit Saturations) systems, as described by Peaceman, D., *Fundamentals of Reservoir Simulation*, published by Elsevier London, 1977, and Aziz, K. and Settari, A.: *Petroleum Reservoir Simulation*, Elsevier Applied Science Publishers, London, 1979. There are a wide variety of specific FIM and IMPES formulations, as described by Coats, K. H.: "A Note on IMPES and Some IMPES-Based Simulation Models", *SPEJ* (5) No. 3, (September 2000), at 245, incorporated herein by reference.

The fully implicit method (FIM) assumes that all the variables and the coefficients that depend on these variables are treated implicitly. In a FIM system, all cells have a fixed number of unknowns, greater than one unknown, represented herein by the letter "m". As a result, the FIM is unconditionally stable, so that one can theoretically take any time step size. At each time step, a coupled system of nonlinear algebraic equations, where there are multiple degrees of freedom (implicit variables) per cell, must be solved. The most common method to solve these nonlinear systems of equations is the Newton-Raphson scheme, which is an iterative method where the approximate solution to the nonlinear system is obtained by an iterative process of linearization, linear system solution and updating. The Newton-Raphson method provides that for f(x)=0, a solution can be found using an iteration:

$$x_{n+1} = x_n - (f(x_n)/f'(x_n)) \tag{Eq. 1}$$

And, given an appropriate starting point, for an equation x=g(x), the iteration $x_{n+1}=g(x_n)$ will converge to a root "a", if |g'(a)|\1t1.

FIM simulations are computationally demanding. A linear system of equations with multiple implicit variables per cell arise at each Newton-Raphson iteration. The efficiency of a reservoir simulator depends, to a large extent, on the ability to solve these linear systems of equations in a robust and computationally efficient manner.

In an IMPES method, only one variable, typically pressure, is treated implicitly. All other variables, including but not limited to saturations and compositions, are treated explicitly. Moreover, the flow terms (transmissibilities) and the capillary pressures are also treated explicitly. For each cell, the conservation equations are combined to yield a pressure equation. These equations form a linear system of coupled equations, which can be solved for the implicit variable, typically pressure. After the pressure is obtained, the saturations and capillary pressures are updated explicitly. Explicit treatment of saturation (and also of transmissibility and capillary pressure) leads to conditional stability. That is, the maximum allowable time step depends strongly on the characteristics of the problem, such as the maximum allowable throughput, and/or saturation change, for any cell. When the time step size is not too restrictive, the IMPES method is extremely useful. This is because the linear system of equations has one implicit variable, usually pressure, per cell. In most practical settings, however, the stability restrictions associated with the IMPES method lead to impractically small time steps.

The adaptive implicit method (AIM) was developed in order to combine the large time step size of FIM with the low computational cost of IMPES. See Thomas, G. W. and Thurnau, D. H, "Reservoir Simulation Using an Adaptive Implicit Method," *SPEJ* (October, 1983), p 759 ("Thomas and Thurnau"), incorporated herein by reference. In an AIM system, the cells of the grid may have a variable number of unknowns. The AIM method is based on the observation that in most cases, for a particular time step only a small fraction of the total number of cells in the simulation model requires FIM treatment, and that the simpler IMPES treatment is adequate for the vast majority of cells. In an AIM system, the reservoir simulator adaptively and automatically selects the appropriate level of implicitness for a variable (e.g. pressure, saturation) on a cell by cell basis. (See Thomas & Thurnau.) Rigorous stability analysis can be used to balance the time step size with the target fraction of cells having the FIM treatment. See Coats, K. H. "IMPES Stability: Selection of Stable Timesteps", *SPEJ* (June 2003), pp 181-187, incorporated herein by reference. The computer solution for AIM systems, however, can be difficult and inefficient because of the variable number of unknowns per cell. The '146 patent by Watts describes a recent attempt to address this problem. The '146 patent describes:

"a method for performing reservoir simulation by solving a mixed implicit-IMPES matrix (MIIM) equation. The MIIM equation arises from a Newton iteration of a variable implicit reservoir model. The variable implicit reservoir model comprises a plurality of cells including both implicit cells and IMPES cells. The MIIM equation includes a scalar IMPES equation for each of the IMPES cells and a set of implicit equations for each of the implicit cells."

(The 146 patent at Col. 8, lines 8-16.) The '146 patent presents "a method of solving an implicit linear equation," having the form:

$$Ax=C, \quad (Eq. 2)$$

where A is a known matrix, C is a known vector and x is an unknown vector. (the '146 patent, col. 9, lines 62-66.)

The '146 patent discloses at least three ways of solving the mixed implicit-IMPES equation. The first is a "first linear solver method" which includes these steps:

"1. Construct a global IMPES pressure matrix equation from the mixed implicit-IMPES matrix equation . . . .

2. Compute the coefficients for the saturation equations (1.2.30) at the implicit cells.

3. Solve the global IMPES pressure matrix equation for . . . a single intermediate pressure at each cell in the reservoir, and compute pressure changes based on the intermediate pressures . . . and pressures . . . prevailing at the beginning of the iteration;

4. Update implicit equation residuals at the implicit cells based on the pressures changes [of step 3]. . . ;

5. At the implicit cells, solve for improved saturations . . . in saturation equations . . . derived using a constraint of total velocity conservation between cells.

6. Update implicit equation residuals at the implicit cells and at the fringe of IMPES cells that are in flow communication with the implicit cells based on the saturation solutions obtained in step 5.

7. Determine if a convergence condition is satisfied."

(The '146 Patent at col. 22, line 59 through col. 23, line 28.) See also FIG. 6A of the '146 Patent and related discussion therein. The practitioner repeats steps 2-6 until convergence. (The '146 Patent at col. 23 lines 26-28.)

The second method of the '146 patent uses the following steps:

1. Construct a global IMPES pressure matrix equation from the mixed implicit-IMPES matrix equation . . . .

2. Solve the global IMPES pressure matrix equation for intermediate pressures . . . i.e. a single intermediate pressure at each cell in the reservoir, and compute pressure changes . . . based on the intermediate pressures . . . and pressures . . . prevailing at the beginning of the iteration.

3. Compute implicit equation residuals at the implicit cells based on the pressures changes . . . computed in step 2.

4. At the implicit cells, solve for improved saturations . . . and second intermediate pressures . . . by performing one or more iterations with a selected preconditioner . . . .

5. Update implicit equation residuals at the implicit cells and at the fringe of IMPES cells that are in flow communication with the implicit cells based on the improved saturations and second intermediate pressures obtained in step 4.

6. Determine if a convergence condition is satisfied.

(The '146 Patent at col. 24, lines 19-52.) See also FIG. 6B of the '146 Patent and related discussion therein. The practitioner repeats steps 2-6 until convergence. (The '146 Patent at col. 24, lines 51-52.)

The third method of the '146 patent "effectively requires an unstructured implicit equation solver." Steps 1-3 and 6 of the third method of the '146 patent are the same as in the second method. Steps 4 ("4.sup.II") and 5 ("5.sup.II") of the third method are:

4.sup.II. Solve for saturations $S_{subj.}^{n+2/3}$ and pressures $P_{subj.}^{n+2/3}$ at the implicit cells while holding fixed the pressures in the surrounding fringe (of IMPES cells) to the values . . . determined during the IMPES pressure solution. Any method can be used to generate the solutions for saturations . . . and pressures . . . , but it must be able to deal with the unstructured form of the implicit cell equations.

5.sup.II. Update residuals in the fringe of IMPES cells. Since the implicit equations have been solved, their residuals will satisfy the convergence criteria.

(The '146 Patent at col. 25, lines 40-57.) See also FIG. 6C of the '146 Patent and related discussion therein.

However, the approaches to solving this problem available today have significant disadvantages. For example, it is well known that reservoir simulation matrices can best be approximately factored if they are ordered cell by cell. This means that all operations in the factorization and preconditioning step are performed as sub-matrix operations. These sub-matrices have relatively small dimensions. For FIM matrices with m unknowns per block, these sub-matrix blocks are all of order m×m. Thus for optimum efficiency the short length software loops for performing these m×m block operations may be unrolled, in order to significantly increase the overall speed of the matrix solution. By contrast with the m×m sub-matrix blocks of a FIM system, this unrolling approach for AIM systems cannot be efficiently implemented due to the varying dimensions of the sub-matrix blocks. The '146 patent does not appear to disclose an efficient unrolling technique for FIM or AIM systems.

In addition, methods without spatial overlapping can entail a slow convergence. Such methods require significant computing resources, which increases cost and lowers efficiency. The 146 patent does not appear to disclose spatial overlapping.

The present invention includes use of a global pressure matrix solution combined with efficient unrolling of loops, including spatial overlapping, in the approximate factorization of the multivariable sub-system, as a preconditioning for AIM systems.

SUMMARY OF THE INVENTION

In view of the above problems, an object of the present invention is to provide methods, apparatuses and systems for more effectively and efficiently simulating fluid flow in reservoirs while eliminating or minimizing the impact of the problems and limitations described.

Other objects, features and advantages of the present invention will become apparent to those of skill in art by reference to the figures, the description that follows and the claims.

BRIEF DESCRIPTION OF THE DRAWINGS

FIG. 1b illustrates an exploded view of a section in the reservoir depicted in FIG. 1a.

FIG. 6 is a flowchart of an alternate preferred embodiment of step 250 of FIG. 4, focusing on True-IMPES reduction.

FIG. 11 depicts the result of a restriction operator $R_i$ selection using a preferred embodiment of the present invention and the region of interest example depicted in FIG. 7, where i is equal to two.

FIG. 12 depicts the result of a restriction operator $R_i$ selection using a preferred embodiment of the present invention and the example depicted in FIG. 7, where i is equal to three.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

The following terms are defined below for clarification and are used to describe the drawings and embodiments of the invention:

"IMPES cell": a cell having only a single unknown variable (typically pressure). Also called a "single variable cell."

"Implicit cell": a cell having more than one unknown variable. Also called a "multi-variable cell."

"Multi-variable cell": a cell having more than one unknown variable. Also called an "implicit cell."

"Single variable cell": a cell treated as if it has only a single unknown variable (typically pressure). Also called an "IMPES cell"

For convenience, the description has been divided up into sections. Section 1 includes a general description of preferred embodiments of the present invention. Section 2 is a description of constructing the k sub-collections in accordance with a preferred embodiment of the present invention. Section 3 discusses preconditioning in accordance with a preferred embodiment of the present invention. Section 4 discusses efficient unrolling of do-loops in accordance with a preferred embodiment of the present invention. Section 5 contains an error analysis discussion.

Section 1: General Description

Figure 1A:
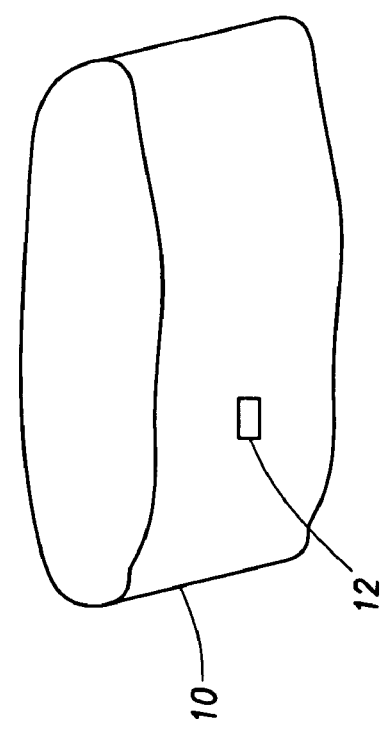
FIG. 1a illustrates a representation of a reservoir.
Figure 1B:
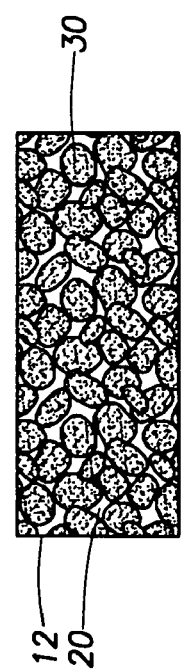

FIG. 1a illustrates a representation of a reservoir 10, with a section 12, which is depicted in an exploded (two dimensional) view in FIG. 1b. Reservoirs 10 (below the water table) typically contain fluid 20, such as oil, gas, water or a mixture of two or three of those substances filling the pore spaces between the porous media 30 (such as, for example, sandstone or limestone) that makes up the rock of the reservoir.

Figure 2:
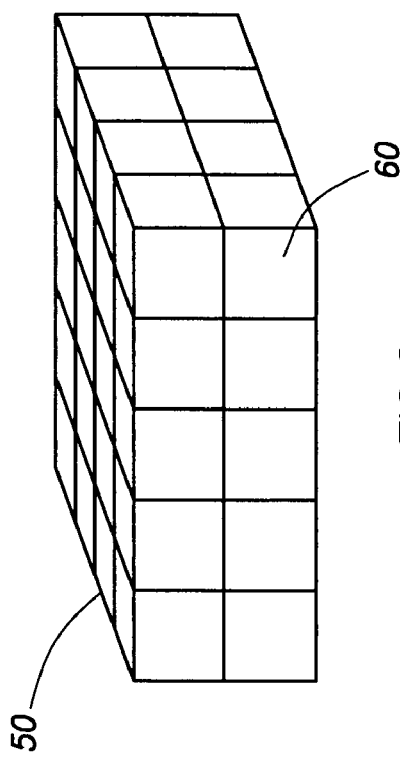
FIG. 2 is a representation of a region of interest in a reservoir, gridded in accordance with a preferred embodiment of the present invention.

FIG. 2 depicts a three-dimensional view of a gridding of a region of interest in a reservoir (not depicted in FIG. 2) in accordance with a preferred embodiment of the invention. (Of course, "gridding of a region of interest" means imposing a grid on a model of the region of interest, generally stored on computer readable media, not imposing a physical grid of some sort underground in the region of interest in the Earth itself.) The region of interest 50 is gridded into cells 60. Although a structured grid is depicted in FIG. 2, the gridding in accordance with the present invention may be structured or unstructured. Commercial software applications for gridding regions of interest, such as GOCAD, FLOGRID and PETREL, are readily available.

Figure 3:
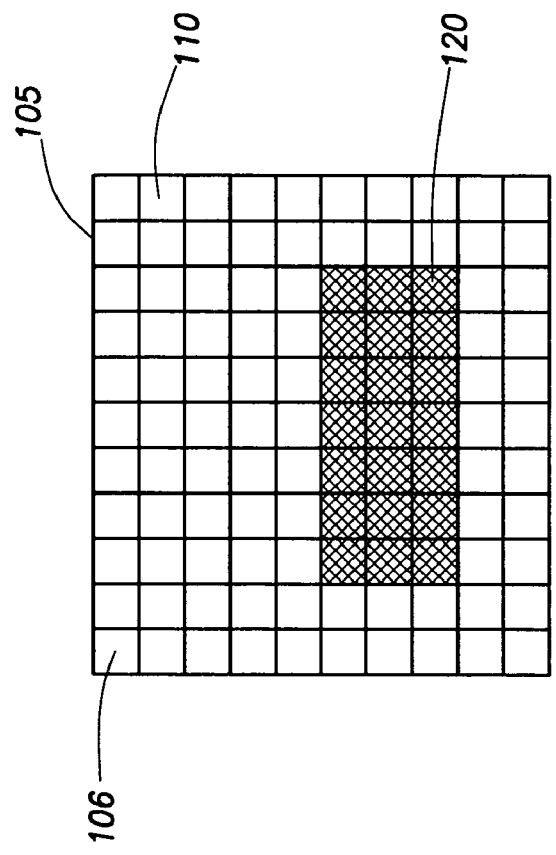
FIG. 3 depicts a simplified, two-dimensional view of a region of interest in a reservoir, gridded in accordance with a preferred embodiment of the present invention.

FIG. 3 depicts a simplified, two-dimensional view of a region of interest 105 in a reservoir gridded into cells, such as cell 106, in accordance with a preferred embodiment of the present invention. In the example of FIG. 3, different types of cells are illustrated as having different shadings. The cells each have one or more unknown properties, represented by variables. The different cell types are distinguished by the number of variables, representing the unknown properties that the different cells have. There may be implicit cells, having more than one unknown variable, and IMPES cells, which if present, have a single unknown variable. In the example depicted in FIG. 3, cells with no shading ("IMPES cells" 110) have one unknown property, represented by one variable, and cells with densely dotted shading ("type 2 cells" 120) have three unknowns properties, represented by three variables.

The one common unknown variable is typically pressure, but could be some other variable. Type 1 cells, if any, are the IMPES cells. Multivariable cell types are numbered sequentially herein, starting at two, based on their number of unknown variables, with type 2 cells having the lowest number of unknown variables greater than one, type 3 cells having the next highest number of unknown variables, and so on in increasing numbers of unknown variables. Although it is common to have one or more cells having only one unknown variable (IMPES cells), cells with only a single unknown variable are not required to be present in the grid in order to practice the present invention.

Figure 4:
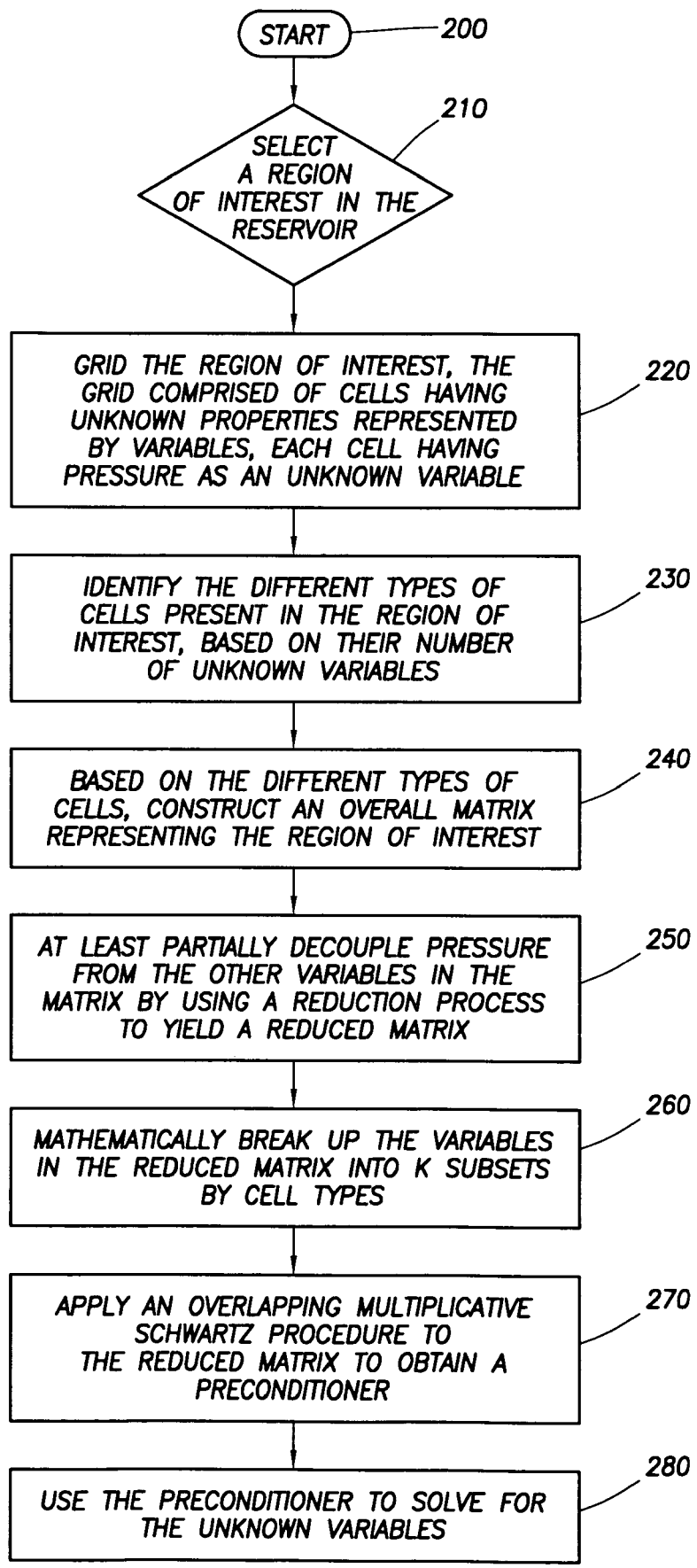
FIG. 4 is a flowchart of a preferred embodiment of the present invention.

FIG. 4 is a flowchart of a preferred embodiment of the present invention. After starting 200, a region of interest in a reservoir is selected 210 for modeling. The region of interest is gridded 220, the grid being comprised of cells having unknown properties represented by variables, each cell having one common unknown variable. Typically, as listed in step 220 of FIG. 4, the common unknown variable is pressure. The grid may be structured or unstructured. Different types of cells present in the region of interest are identified 230 based on their number of unknown variables.

Continuing to refer to FIG. 4, a matrix is constructed 240 to represent the region of interest based on the different types of cells. For the example of FIG. 3, which has two types of cells in the region of interest 105, type 1 cells 110, having one unknown variable, and type 2 cells 120, having three unknown variables, the AIM matrix A would be written in block 3×3 form as follows:

$$A = \begin{bmatrix} A_{ss} & A_{sq} & A_{se} \\ A_{qs} & A_{qq} & A_{qe} \\ A_{es} & A_{eq} & A_{ee} \end{bmatrix} \quad \text{(Eq. 3)}$$

where s denotes non-pressure variables in the type 2 cells 120, q denotes pressures in type 2 cells 120 and e denotes pressures in type 1 cells 110. All variables are ordered cell by cell, according to the above matrix partitioning.

For a single variable cell-type, the matrix A requires one block row and one block column. But for each multivariable cell-type, the matrix A requires two additional block rows and two additional block columns. For the example of FIG. 3, which has two types of cells only one of which is a multivariable cell type, the matrix A requires, as depicted above, one block column and one block row for the single variable cell type (the type 1 cells 110) and requires two additional block rows and two additional block columns for the single multivariable cell type (the type 2 cells 120) for a total of three block columns and three block rows. And, for example, if one had three types of cells, one of which being a type 1 cell and the others being multivariable cell types, the matrix A would have five block rows and five block columns.

The following equation is used to solve for the unknown variables, called x:

$$Ax=b \quad \text{(Eq. 4)}$$

where x is a block vector of the variables representing unknown properties of the cells and b is a block vector of known quantities. This is the same equation as Eq. 2 herein (as given in the '146 patent), with the "C" of Eq. 2 replaced by the letter "b." The form given in Eq. 4 was chosen because it is consistent with other writings and work of the instant inventors, but the two equations are identical. In Eq. 4, block vector x and block vector b are the same length. The length of block vector x and block vector b is same as the total number of cells in the region of interest. For the example depicted in FIG. 3, where the region of interest 105 is ten cells tall by eleven cells wide, the length of both vector x and vector b is one hundred and ten, which is the same as the total number of cells.

Referring again to FIG. 4, the next step to solving Eq. 4, is to at least partially decouple 250 pressure from the other variables in the matrix by using a reduction process to yield a reduced matrix. (In embodiments where something other than pressure is the common unknown variable, that variable (not pressure) would be at least partially decoupled from the other variables in this step.) There are many different known reduction processes that may be used to decouple pressure from the other variables in accordance with the present invention. Some reduction processes may be more appropriate in some situations than others might be. Two reduction processes that may be used are a Quasi-IMPES reduction and a True-IMPES reduction, both more fully discussed below. The True-IMPES reduction typically yields a more nearly symmetric pressure matrix than Quasi-IMPES. Quasi-IMPES works well if symmetry is not a major issue for the preconditioning method. But some preconditioning methods, such as an algebraic multi-grid (AMG) preconditioning method, are more effective for symmetric and nearly symmetric matrices than for non-symmetric matrices. Accordingly, a True-IMPES would be more appropriate, for example, if an AMG method is used to solve for pressure.

In reservoir simulation, using an IMPES reduction is a common practice for approximately decoupling pressure from the other variables. In Wallis, J. R., Kendall, R. P., and Little, T. E.: "Constrained Residual Acceleration of Conjugate Residual Methods", SPE 13536, presented at the SPE Symposium on Reservoir Simulation, Houston, Tex., Feb. 10-13, 1985 (Wallis, et al 1985"), incorporated herein by reference, the authors use an algebraic procedure in a method called "CPR." The CPR method as described in the cited paper is applied to linear systems associated with FIM. That algebraic procedure is called herein a "Quasi-IMPES reduction."

Figure 5:
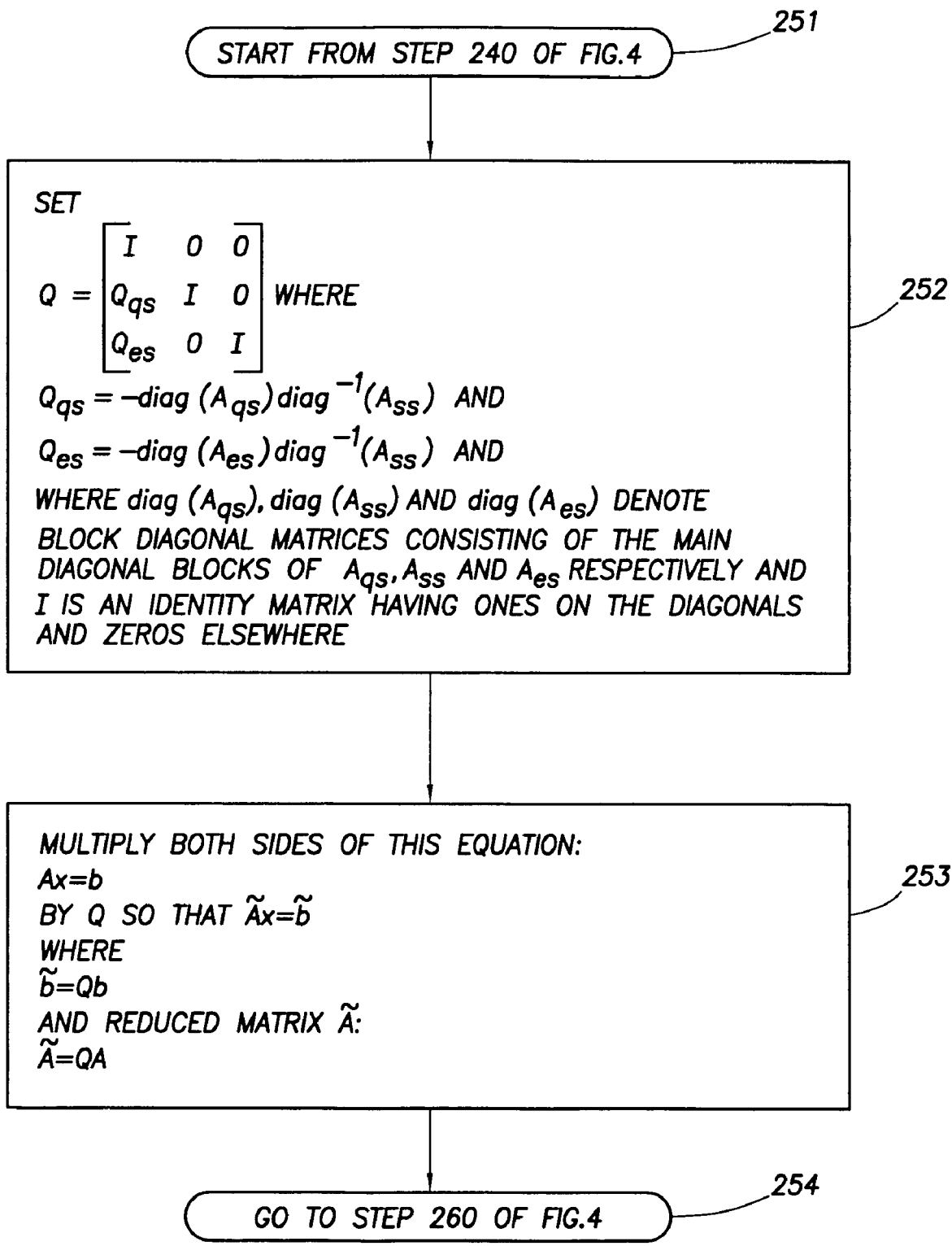
FIG. 5 is a flowchart of a preferred embodiment of step 250 of FIG. 4, focusing on a Quasi-IMPES reduction.

FIG. 5 depicts a flowchart of a preferred embodiment of an aspect of the present invention implementing the Quasi-IMPES reduction. The Quasi-IMPES reduction is described by the following scaling matrix Q, where Q is set 252 so:

$$Q = \begin{bmatrix} I & 0 & 0 \\ Q_{qs} & I & 0 \\ Q_{es} & 0 & I \end{bmatrix} \quad \text{(Eq. 5)}$$

and where $$Q_{qs} = -\text{diag}(A_{qs})\text{diag}^{-1}(A_{ss}) \quad \text{(Eq. 6)}$$

and $$Q_{es} = -\text{diag}(A_{es})\text{diag}^{-1}(A_{ss}) \quad \text{(Eq. 7)}$$

where diag($A_{qs}$), diag($A_{ss}$) and diag($A_{es}$) denote block diagonal matrices consisting of the main diagonal blocks of $A_{qs}$, $A_{ss}$ and $A_{es}$ respectively. I is an identity matrix having ones on the diagonals and zeros elsewhere.

Continuing with FIG. 5, both sides of Eq. 4, Ax=b, are multiplied 253 by Q, so that Ax=b becomes:

$$\tilde{A}x=\tilde{b} \quad \text{(Eq. 8).}$$

The reduced matrix $\tilde{A}$ is calculated as the product of the scaling matrix Q and the matrix A:

$$\tilde{A}=QA \quad \text{(Eq. 9)}$$

and $$\tilde{b}=Qb \quad \text{(Eq. 10)}$$

The True-IMPES reduction is another reduction process that may be performed in accordance with the present invention. A preferred embodiment of the present invention using a True-IMPES reduction is depicted in FIG. 6. The True-IMPES reduction is discussed in Stone, H. L. and Garder, Jr., A. O.: "Analysis of Gas-Cap or Dissolved-Gas Drive Reservoirs", AIME (1961), Vol. 222, incorporated herein by reference. A True-IMPES scaling matrix (called herein T) may be calculated. Referring to FIG. 6, start 255 by setting 256 T as follows:

$$T = \begin{bmatrix} I & 0 & 0 \\ T_{qs} & I & 0 \\ T_{es} & 0 & I \end{bmatrix} \quad \text{(Eq. 11)}$$

In the True-IMPES reduction: for T:

$$T_{qs}=-\text{colsum}(A_{qs})\text{colsum}^{-1}(A_{ss}) \quad \text{(Eq. 12)}$$

$$T_{es}=-\text{colsum}(A_{es})\text{colsum}^{-1}(A_{ss}) \quad \text{(Eq. 13)}$$

where $\text{colsum}(A_{qs})$, $\text{colsum}(A_{ss})$ and $\text{colsum}(A_{es})$ denote block diagonal matrices, and where each diagonal block is the sum of the blocks in the corresponding block column of $A_{qs}$, $A_{ss}$ and $A_{es}$ respectively.

Referring back to FIG. 6, multiply 257 both sides of Eq. 4, Ax=b, by T to yield Eq. 8, $\tilde{A}x=\tilde{b}$, but where $$\tilde{b}=Tb \quad \text{(Eq. 14)}$$

and reduced matrix $\tilde{A}$:

$$\tilde{A}=TA \quad \text{(Eq. 15)}$$

In addition, other types of reductions could be used for step 250 in FIG. 4.

Referring again to FIG. 4, the set of all of the unknown variables of the grid will be broken up 260 into a number of subsets. Let k be the number of implicit cell types plus one, the "one" representing a global set, typically with a single, common unknown variable, usually pressure. Recall that implicit cells are those cells having more than one unknown variable. The k subsets may overlap. Section 2 contains a description of a preferred embodiment of step 260 in FIG. 4 for constructing the k subsets.

Preconditioners are applied to equations to make them easier to solve. To construct a preconditioner for Eq. 8, $\tilde{A}x=\tilde{b}$, an overlapping multiplicative Schwarz procedure, which can take various forms, is applied (step 280 of FIG. 4). This is further discussed in Section 3.

Section 2: Breaking up the Region of Interest into k Subsets

Figure 7:
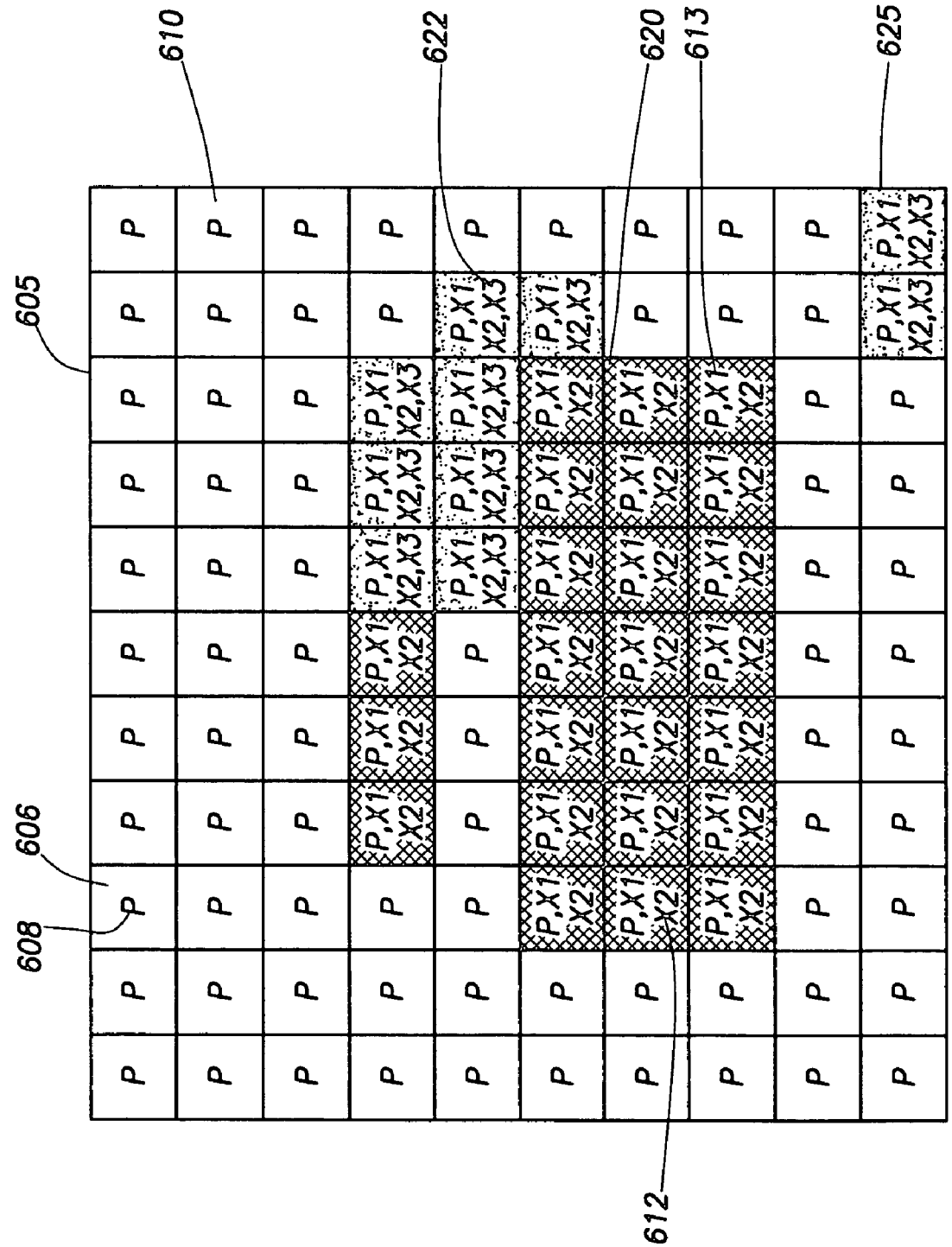
FIG. 7 is a representation of a region of interest in accordance with a preferred embodiment of the present invention.

FIG. 7 depicts a region of interest 605, having type-1 cells with one unknown variable, type-2 cells with three unknown variables and type-3 cells with four unknown variables. There are three different types of cells in the example of FIG. 7; as a result, k is equal to three, where k is the number of implicit cell types plus one. Recall that an implicit cell type is a cell type with more than one unknown variable per cell. Unknown variables for the cells are indicated by letters placed within the relevant cells 606. In the example of FIG. 7, a pressure unknown variable is generally, labeled P, and non-pressure unknown variables, e.g., saturations, compositions, temperature, are generically labeled X1, X2, . . . , Xn. In the example of FIG. 7, type-1 cells 610 are labeled with a single P 608; type-2 cells 620 (i.e., three unknown variables, with a 25% shading pattern) are labeled with P, X1 612 (for oil saturation), and X2 613 (for water saturation), and type-3 cells 625 (i.e., four unknown variables, a divot shading pattern in FIG. 7) are labeled P, X1, X2, and X3 622 (for temperature).

Figure 8:
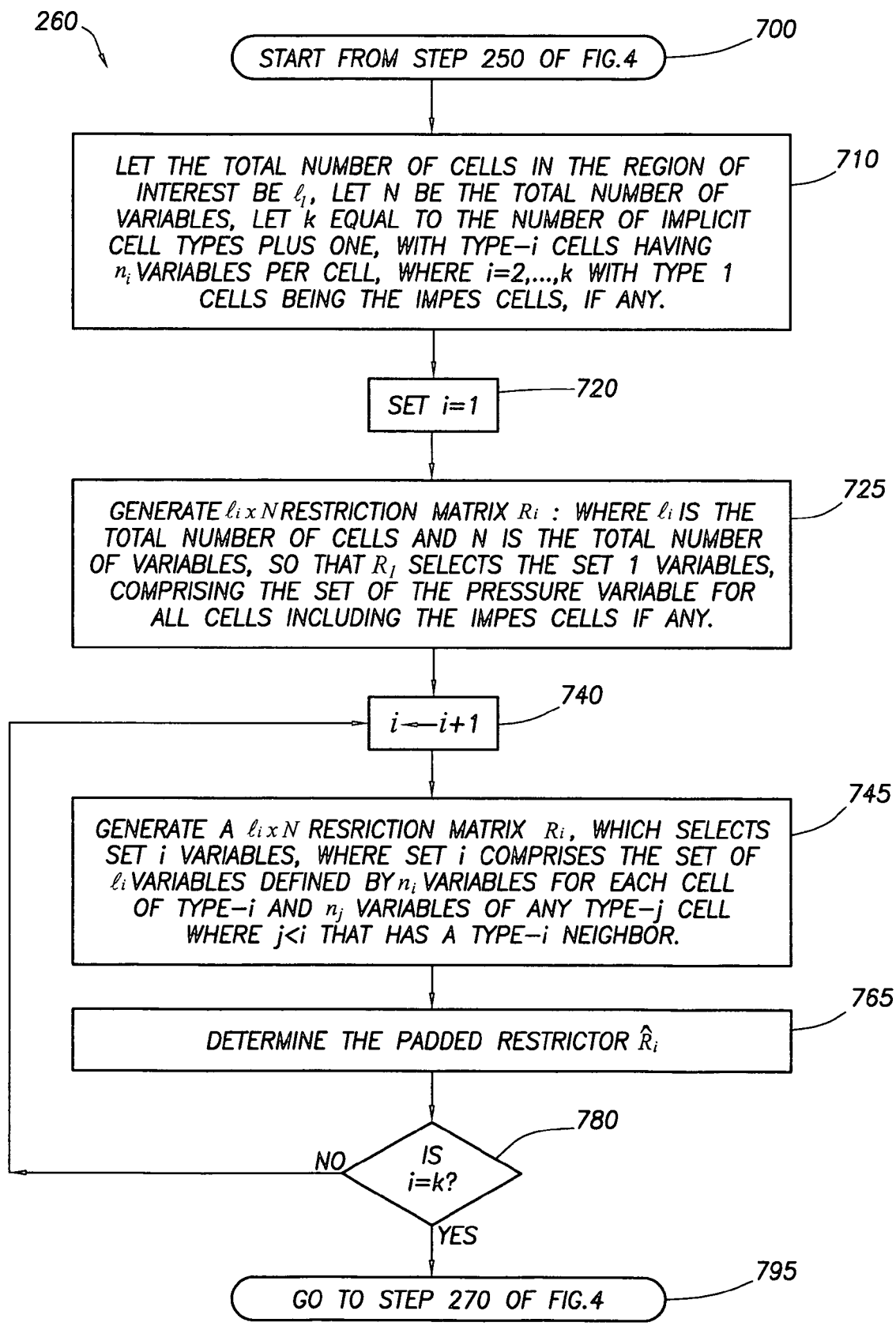
FIG. 8 is a flowchart of a preferred embodiment of the present invention for the step of constructing the k subsets (step 260 of FIG. 4).

FIG. 8 is a flowchart of a preferred embodiment of the present invention for the step of constructing the k subsets (step 260 on FIG. 4). Start 700 from step 250 of FIG. 4 and let 710 the total number of cells in the region of interest be $l_1$, let N be the total number of variables, and let k be equal to the number of implicit cell types plus one. Type-i cells have $n_i$ variables per cell, where i=2, . . . , k. Type 1 cells are the IMPES cells (if any). In the example depicted in FIG. 7, $l_1$ would be 110, N would be 188 and k would be 3. Let 720 i equal to 1. Generate 725 restriction matrix $R_1$, which selects Set 1, comprising the set of the pressure variable (or in other embodiments, whatever the common unknown variable is, if that is not pressure) for all cells, including the IMPES cells present, if any. This allows selection of all the cells in the region of interest. In order for this to work properly, the common unknown variable (pressure, in this example) should be in the first position in each cell. If the common unknown variable is in a different position, the algorithm would have to be modified accordingly.

Figure 9:
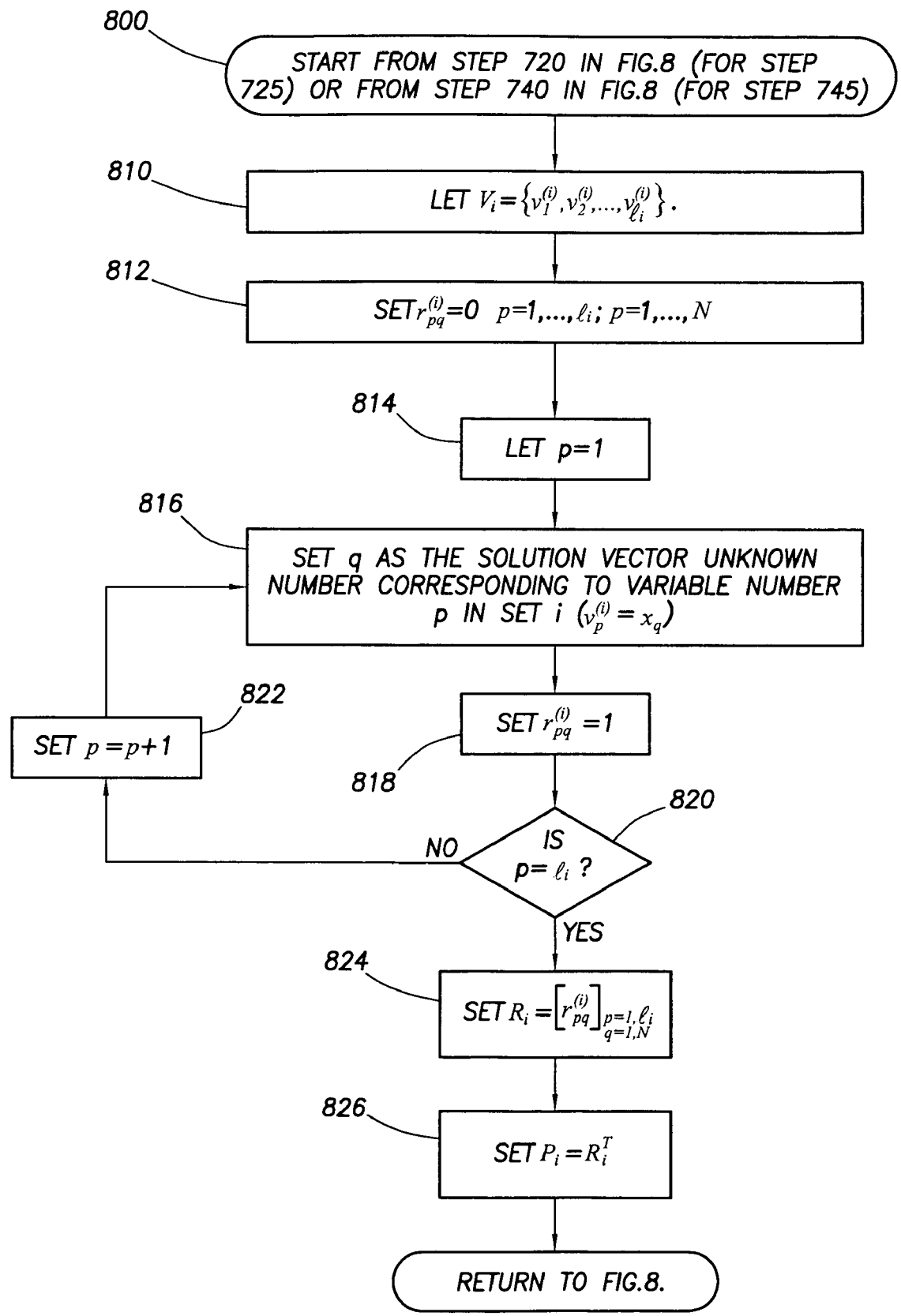
FIG. 9 is a depiction of a flowchart for a preferred embodiment of step 745 of FIG. 8.

A detailed version of FIG. 8's step 725 (for i equal to one) and step 745 (for i greater than one) is depicted in FIG. 9. Start 800 from step 720 in FIG. 8, for step 725 (or from step 740 in FIG. 8, for step 745). Let 810:

$$V_i=\{v_1^{(i)}, v_2^{(i)}, \ldots, v_{l_i}^{(i)}\} \quad \text{(Eq. 16)}$$

Set 812 $r_{pq}^{(i)}$ equal to zero, p equal to a range of 1, . . . , $l_i$; and q equal to a range of 1, . . . , N. Let 814 p equal 1. Set 816 q as the solution vector unknown number corresponding to variable number p in Set i ($v_p^{(i)}=x_q$). Set 818 $r_{pq}^{(i)}$ equal to one. Determine 820 whether p is equal to $l_i$. If not, set 822 p equal to p+1 and return to step 816. If p is equal to $l_i$, set 824 $R_i$ equal to $$[r_{pq}^{(i)}]_{\substack{p=1,l_i \\ q=1,N}}.$$

Set 826 $P_i$ equal to $R_i^T$ and return to FIG. 8 (to step 740 if using FIG. 9 for step 725 or to step 765 if using FIG. 9 for step 745).

Figure 10:
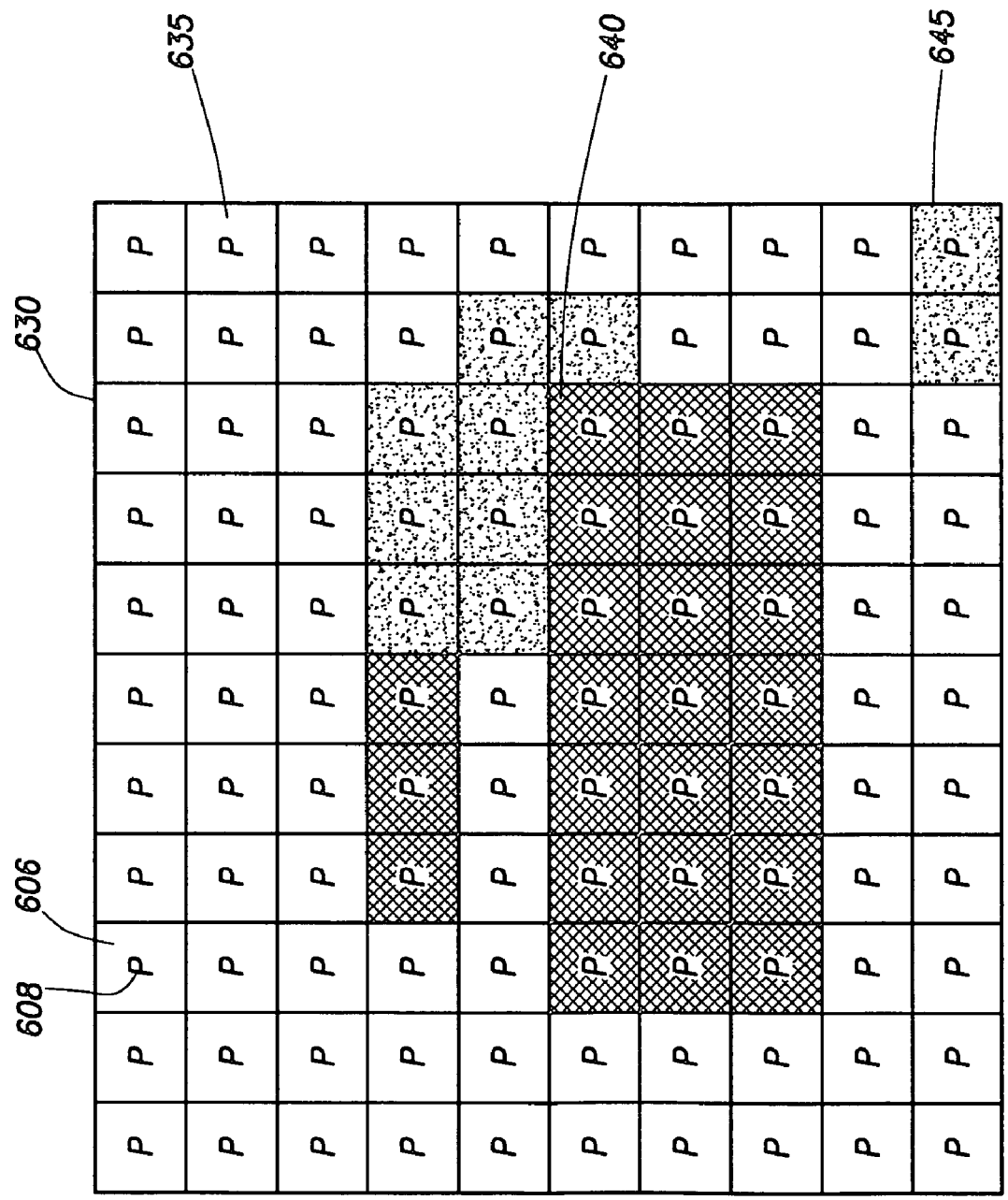
FIG. 10 depicts the result of a restriction operator $R_1$ selection using a preferred embodiment of the present invention and the region of interest example depicted in FIG. 7.

FIG. 10 depicts the result of a restriction operator $R_1$ selection using the example depicted in FIG. 7. The use of restriction operator $R_1$ in this example results in a Set 1 630, where pressure is the only unknown variable. Each cell 606 that has pressure 608 as an unknown variable is selected, whether it is a cell-with-only-one-unknown-variable 635 or a cell-with-more-than-one-unknown 640, 645.

Referring again to FIG. 8, set 740 i equal to i plus one. Generate 745 a $l_i \times N$ restriction matrix $R_i$, which selects Set i variables, where Set i comprises the set of $l_i$ variables defined by $n_i$ variables for each cell of Type-i and $n_j$ variables of any Type-j cell (where j is less than i) that has a Type-i neighbor sharing more than a single point. Again, FIG. 9 depicts a detailed flowchart for a preferred embodiment of step 745 of FIG. 8. The Type-j cells having Type-i neighbors are called "neighbor cells" herein. The variables are ordered cell by cell.

Figure 11:
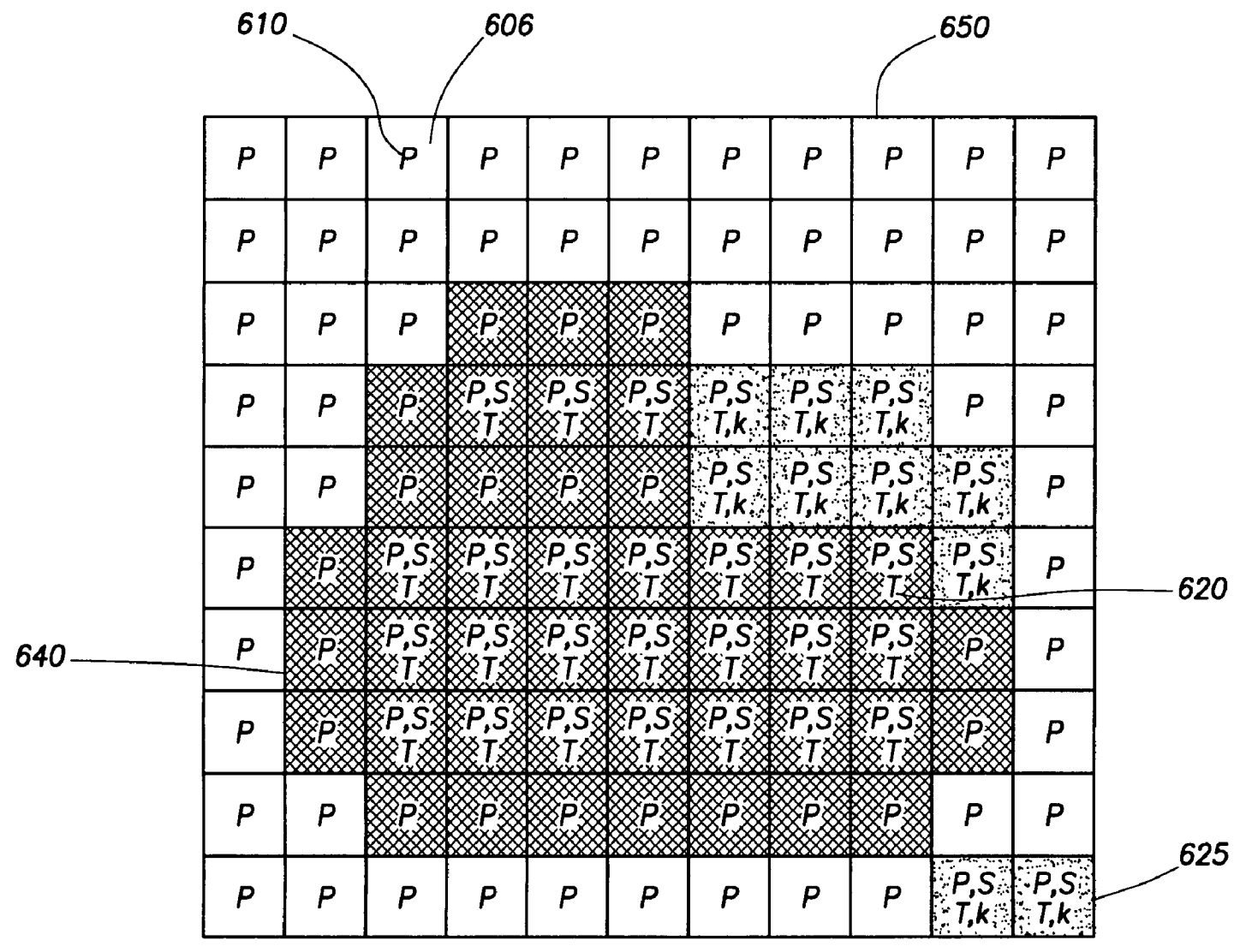

FIG. 11 depicts the result 650 of a restriction operator $R_i$ selection using the example depicted in FIG. 7, where i is equal to two. In FIG. 1 as in FIG. 7, type-1 cells such as 610 are labeled with a single P; type-2 cells such as 620 (i.e., three unknown variables) are labeled with P, X1, and X2, and type-3 cells 625 (i.e., four unknown variables) are labeled P, X1, X2, and X3. Because i is equal to two, type-2 cells such as 620 are selected. In addition, neighbor cells that are type j cells, where j is less than i and that border the type-2 cells at more than one point are also selected. In this case type-j cells would be type 1 cells that border the type-2 cells at more than one point, such as 640. All $R_2$ selected cells are shown with a 25% pattern, regardless of their number of variables.

Figure 12:
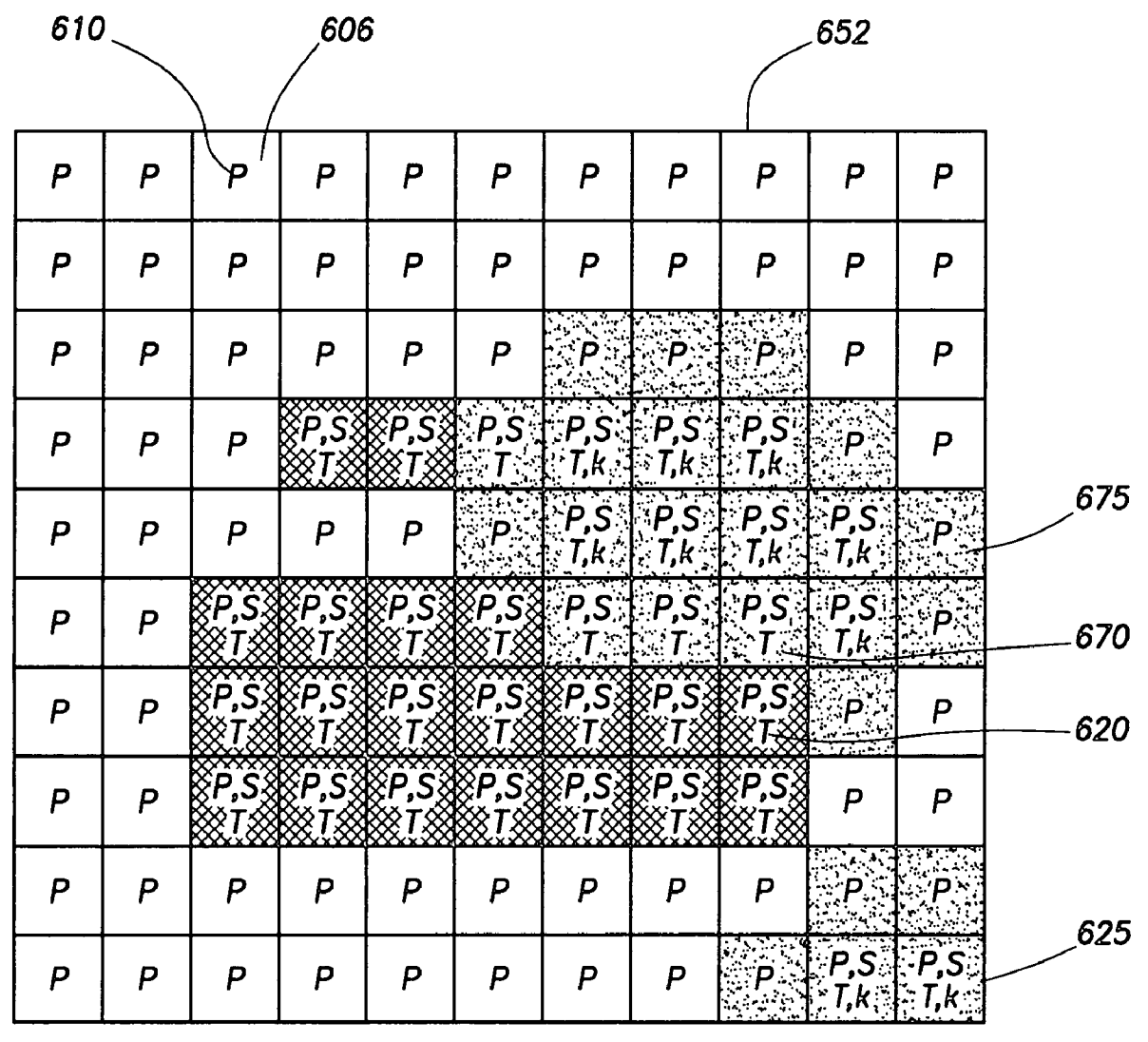

Similarly, FIG. 12 depicts the result 652 of a restriction operator $R_i$ selection using the example depicted in FIG. 7, where i is equal to three. In FIG. 12 as in FIG. 7, type-1 cells 610 are labeled with a single P, type-2 cells, such as 620, are labeled with P, X1, and X2, and type-3 cells, such as 625, are labeled P, X1, X2, and X3. All type-3 cells are selected. Neighbor cells to the type-3 cells, being type-j cells where j is less than i, such as 670, 675 are also selected. All $R_3$ selected cells are shown with a divot (stippling?) pattern, regardless of their number of variables.

Figure 13:
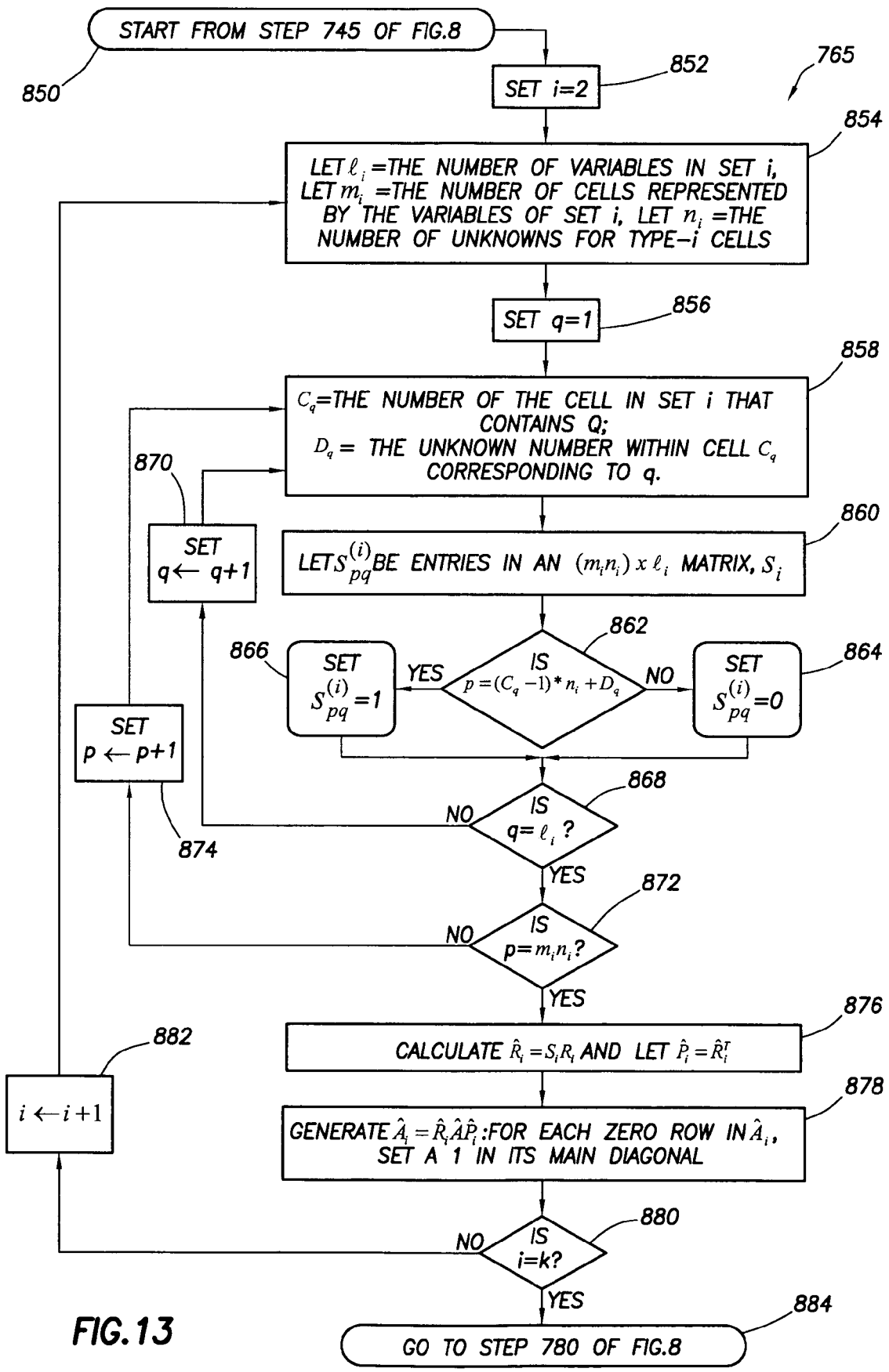
FIG. 13 is a depiction of a flowchart for a detailed version of a preferred embodiment of FIG. 8 step 770, which is the step of constructing the padded restrictor, $\hat{R}_i$.

Referring again to FIG. 8, once the Type-i cells and their respective Type-j neighbor cells are selected, then the next step is to add appropriate numbers of dummy variables to the neighbor cells, by constructing 765 a padded restrictor $\hat{R}_i$. A detailed version of step 770 is depicted in FIG. 13 and is discussed below. Continuing with FIG. 8, if 780 i is not equal to k, then return to step 740. If i is equal to k, then go 795 to step 270 of FIG. 4.

Although FIG. 8 first sets i equal to one in step 720 and proceeds in increasing orders of i in this example (see step 740) and increases until i equals k (see step 780), the methodology of these steps (i.e. the order in which i's are selected for generation of the corresponding restriction matrices) is order independent. In other embodiments, one could start with i equal to k and proceed by decreasing i until i equals one, or proceed to select i in any order one chooses.

FIG. 13 depicts a detailed version of a preferred embodiment of FIG. 8 step 770, which is the step of constructing the padded restrictor, $\hat{R}_i$. The padded restrictor adds dummy variables as needed to the selected neighbor cells. Recall from step 826 of FIG. 9 that $P_i$ equals $R_i^T$ where $R_i^T$ is the transpose of $R_i$. Starting 850 from step 745 of FIG. 8, set 852 i equal to two. Let 854 $l_i$ be the number of variables in Set i, $m_i$ be the number of cells represented by the variables of Set i, and $n_i$ be the number of unknowns for Type-i cells. Set 856 q equal to one. Let 858 $C_q$ be the number of the cell in Set i that contains variable number q ("q-cell") and let $D_q$ be the unknown number within cell $C_q$ corresponding to variable number q. Let 860 $s_{pq}^{(i)}$ be entries in an $(m_i n_i) \times l_i$ matrix, $S_i$. Determine 862 whether p is equal to: $(C_q-1)*n_i+D_q$. If not, then set 864 $s_{pq}^{(i)}$ equal to zero. If so, then set 866 $s_{pq}^{(i)}$ equal to one. Determine 868 whether q is equal to $l_i$. If q is not equal to $l_i$, set 870 q equal to q plus 1 and return to step 858. If q is equal to $l_i$, then determine 872 whether p is equal to $m_i n_i$. If p is not equal to $m_i n_i$, set p equal to p plus one and return to step 858. If p is equal to $m_i n_i$, then calculate 876 $\hat{R}_i$ as the product of Si and Ri and let $\hat{P}_i$ be the transpose of $\hat{R}_i$. Generate 878 the padded Schwarz matrix:

$$\hat{A}_i = \hat{R}_i \tilde{A} \hat{P}_i + D_i \qquad \text{(Eq. 17)}$$

and for each zero row (a row with all zeroes) in $\hat{R}_i \tilde{A} \hat{P}_i$, set a non-zero (1) in its main diagonal. The matrix $D_i$ represents these diagonal entries added to prevent singularity of $\hat{A}_i$ due to the addition of the dummy equations and variables. Determine 880 whether i is equal to k. If i is not equal to k, set 882 i equal to i plus one and return to step 854. If i is equal to k, then go to step 780 of FIG. 8. Remember that the common variable (typically pressure) is preferably always in the first position in each cell; if it is not in the first position, then the algorithms would need to be modified accordingly.

Figure 14:
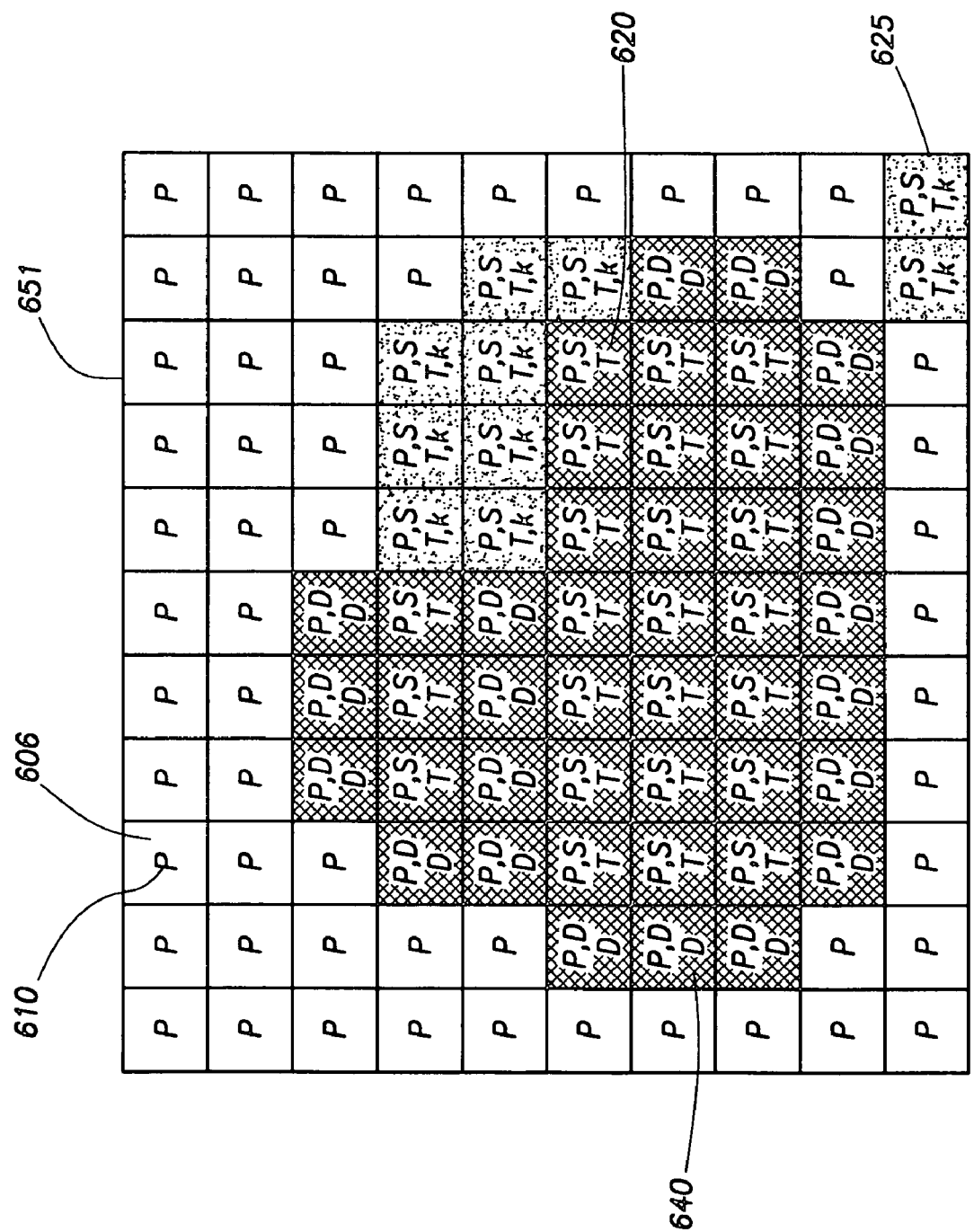
FIG. 14 is a depiction of the result of a padded restrictor, $\hat{R}_i$, as applied to the example of FIG. 11, where i is equal to two.

FIG. 14 depicts the result 651 of a padded restrictor, $\hat{R}_i$, as applied to FIG. 11, with i equal to two. In FIG. 14, as in FIG. 11 and FIG. 7, type-1 cells such as 610 are labeled with a single P; type-2 cells such as 620 (i.e., three unknown variables) are labeled with P, X1, and X2, and type-3 cells 625 (i.e., four unknown variables) are labeled P, X1, X2, and X3. Because i was equal to two, type-2 cells such as 620 were selected in FIG. 11, along with neighbor cells such as 640 that are type-j cells, where j is less than i and that border the type-2 cells at more than one point. As in FIG. 11, all $R_2$ selected cells are shown with a 25% pattern, regardless of their number of variables. Now in FIG. 14, dummy cells indicated by the symbol D have been added to the neighbor cells that were selected such as 640 so that the selected neighbor cells have the same number of variables as the selected type-2 cells, that is three variables.

Figure 15:
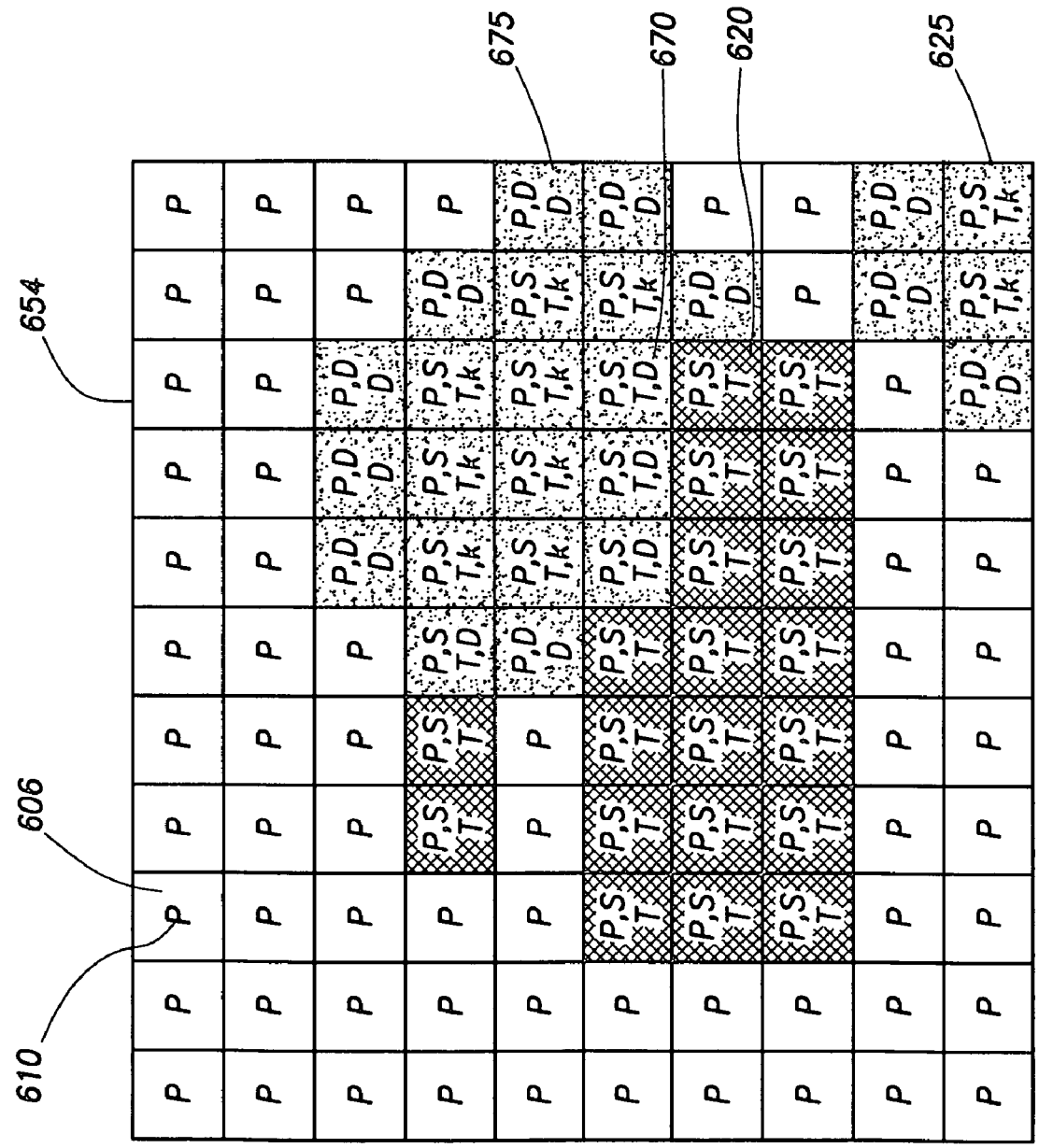
FIG. 15 is a depiction of the result 654 of a padded restrictor, $\hat{R}_i$, as applied to the example of FIG. 12, where i is equal to three.

FIG. 15 depicts the result 654 of a padded restrictor, $\hat{R}_i$, as applied to FIG. 12, with i equal to three. In FIG. 15, as in FIG. 12 and FIG. 7, type-1 cells 610 are labeled with a single P, type-2 cells, such as 620, are labeled with P, X1, and X2, and type-3 cells, such as 625, are labeled P, X1, X2, and X3. Because i was equal to three, all type-3 cells were selected in FIG. 12 along with neighbor cells to the type-3 cells that are type-j cells, where j is less than i, and that border the type-3 cells at more than one point. As i is equal to three for FIG. 12, j is equal to one or two, so type-1 and type-2 cells neighboring type-3 cells, such as 670 a type-2 cell and 675 a type-1 cell, were selected. As in FIG. 12, all $R_3$ selected cells are shown with a divot pattern, regardless of their number of variables. Now in FIG. 15, dummy cells indicated by the symbol D have been added to the neighbor cells that were selected such as 670, 675 so that the selected neighbor cells have the same number of variables as the selected type-3 cells, that is four variables.

Section 3: Preconditioning

Section 3, Case 1: Use of an Overlapping Multiplicative Schwarz Algorithm.

Figure 16:
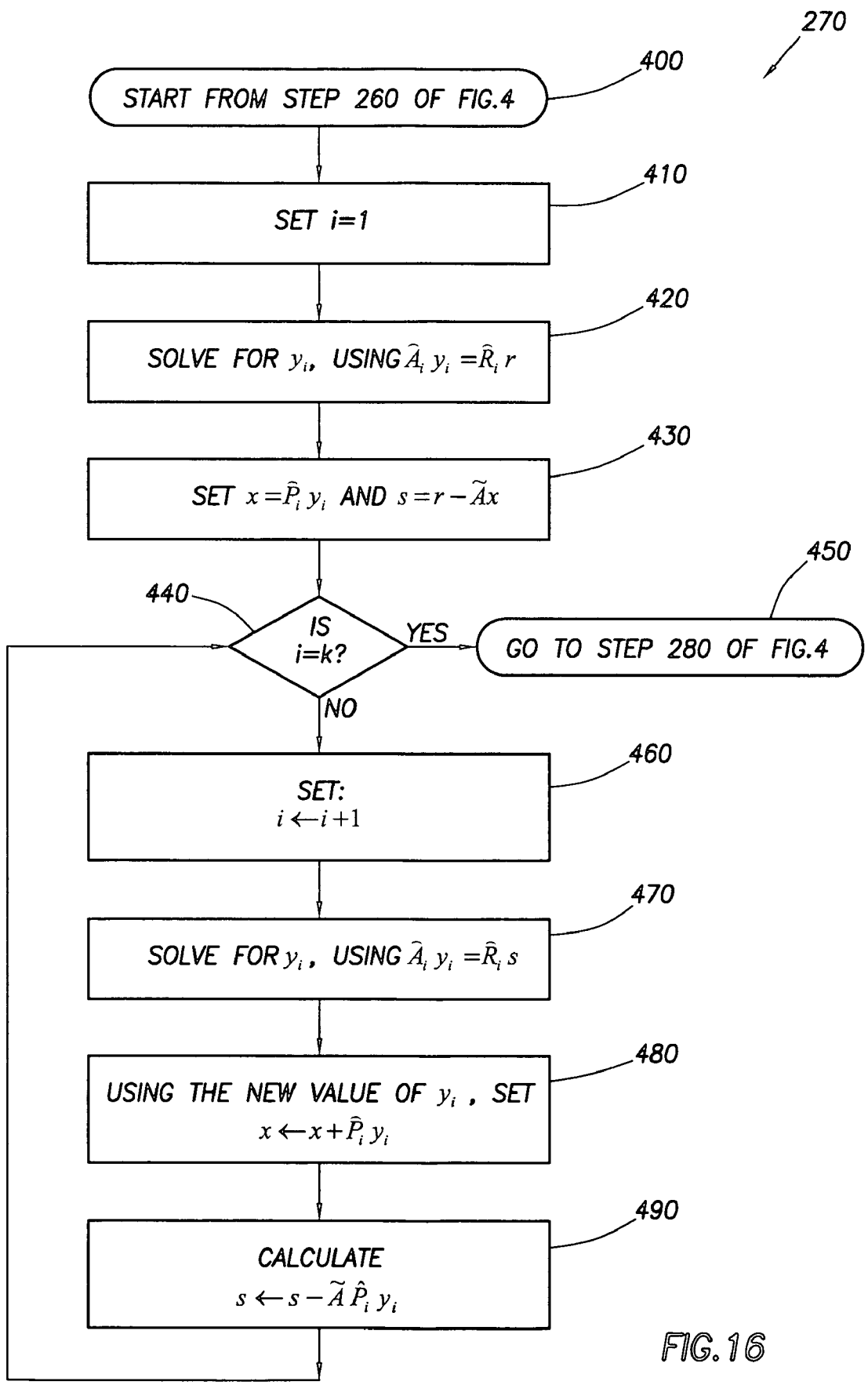
FIG. 16 is a flowchart of a preferred embodiment of step 270 of FIG. 4, depicting use of an overlapping k-block multiplicative Schwarz algorithm to produce a preconditioner.

FIG. 16 is a flowchart of a preferred embodiment of step 270 as depicted in FIG. 4, focusing on use of our overlapping multiplicative Schwarz algorithm to produce a preconditioner.) A residual vector is represented by:

$$r = b - \tilde{A}\tilde{x} \qquad \text{(Eq. 18)}$$

where $\tilde{x}$ is the most recent approximate solution vector. Let $M^{-1}$ be an approximate inverse of $\tilde{A}$. A preconditioned residual $\tilde{r} = M^{-1} r$ is used to improve the approximation of x:

$$x \approx \tilde{x} + \tilde{r} \qquad \text{(Eq. 19)}$$

This is the same x as in Eq. 4, but the effort here is directed to obtaining approximate solutions for x. Temporary variable s is used to hold intermediate residuals, and $y_i$ is an intermediate solution for all the unknown variables on sub-space $V_i$. The use of the overlapping multiplicative Schwarz preconditioning can be defined by the following steps. Referring to FIG. 16, start 400 from step 260 of FIG. 4. As an initial step, set 410 i equal to one. Solve 420 for the pressures y in all cells, using the equation:

$$\hat{A}_i y_i = \hat{R}_i r \qquad \text{(Eq. 20)}$$

and set 430 the approximate solution x to be $$x = \hat{P}_i y_i \qquad (\text{Eq. 21})$$

and set 430 $s = r - \tilde{A}x$. Determine 440 if i is equal to k. If i is equal to k, then go 450 to step 280 of FIG. 4. If i is not equal to k, set 460 i equal to i plus one. Solve 470 for $y_i$ using:

$$\hat{A}_i y_i = \hat{R}_i s \qquad (\text{Eq. 22})$$

Using the new value of $y_i$, calculate 480 a new value of x equal to x plus $\hat{P}_i y_i$. Then calculate 490 a new value of s as:

$$s \leftarrow s - \tilde{A}\hat{P}_i y_i \qquad (\text{Eq. 23})$$

Return to step 440, repeating steps 440 through 480 until i is equal to k. Then proceed 450 to step 280 of FIG. 4.

Section 3, Case 2: Use of an Overlapping Multiplicative Schwarz Algorithm with Inexact Local Solves In practical applications, Equations 20 and 22 may be replaced with inexact local solves. Examples include but are not limited to block ILU(K), Nested Factorization, Line Gauss-Seidel or a preconditioned iterative solution using acceleration methods such as GMRES or ORTHOMIN. See Y. Saad and M. H. Schultz.: "GMRES: a generalized minimal residual algorithm for solving nonsymmetric linear systems", *SIAM Journal on Scientific and Statistical Computing*, 7, PP 856-869, 1986; Vinsome, "P. K. W: "Orthomin, an Iterative Method for Solving Sparse Sets of Simultaneous Linear Equations", SPE 5729 presented at the Fourth Symposium of Numerical Simulation of Reservoir Performance of the Society of Petroleum Engineers of AIME held in Los Angeles, Calif., Feb. 19-20, 1976, all incorporated by reference.

Section 4: Efficient Unrolling

In the preferred embodiments of the invention, efficiency is increased by using an efficient loop unrolling methodology. The padded AIM sub-matrix $\hat{A}_i = \hat{R}_i \tilde{A} \hat{P}_i + D_i$ (i>1) is partitioned in the fixed implicit $n_i \times n_i$ sub-matrix blocks. Thus $\hat{A}_i$ is factored or approximately factored using fixed block-size sub-matrix operations. Also in the solution or approximate solution step using the factors of $\hat{A}_i$ fixed block-size sub-matrix operations are employed. These sub-matrix operations are performed with high efficiency by unrolling inner do-loops (i.e. write out the code in fall instead of using do-loops) associated with the block dimension $n_i$. The introduction of dummy variables and equations causes the factored $\hat{A}_i$ matrices have fixed-sized sub-matrix blocks and makes unrolling practical for AIM preconditioning.

The unrolling method is particularly useful in the implementation of steps 420 and 470 of FIG. 16, which are the most computationally expensive steps in FIG. 16. This loop unrolling technique may also be used in other steps of the invention to also increase efficiency. For example, by grouping all cells of the same type and then partitioning $\tilde{A}$ by these groups generates sub-matrix blocks which may themselves be further partitioned into small fixed size sub-matrix blocks. The efficient use of these sub-blocks in the matrix-vector multiply step in step 490 in FIG. 16 involves unrolling loops whose length is associated with the small dimensions of these sub-blocks.

For the software implementation the AIM sub-matrix $\hat{A}_i = \hat{R}_i \tilde{A} \hat{P}_i + D_i$, i=2, ..., k is partitioned into fixed implicit $n_i \times n_i$ sub-matrix blocks which are used in all factorizations or approximate factorizations of $\hat{A}_i$ and in the Schwarz preconditioning steps. These sub-matrix operations may be done with high efficiency by unrolling inner loops associated with the block dimension $n_i$.

Section 5: Error Analysis.

The following is an error analysis of a method using multiplicative Schwartz algorithm with no overlap, similar to what might be used in accordance with the 146 patent. Eq. 8 may be written as $$\begin{bmatrix} A_{ss} & A_{sq} & A_{se} \\ A_{qs} & A_{qq} & A_{qe} \\ A_{es} & A_{eq} & A_{ee} \end{bmatrix} \begin{bmatrix} x_s \\ x_q \\ x_e \end{bmatrix} = \begin{bmatrix} r_s \\ r_q \\ r_e \end{bmatrix} \qquad (\text{Eq. 24})$$

The following system with auxiliary matrix A* is equivalent to the original system:

$$\begin{pmatrix} A_{qq} & A_{qe} & -A_{qq} & 0 \\ A_{eq} & A_{ee} & 0 & A_{es} \\ 0 & 0 & A_{qq} & A_{qs} \\ A_{sq} & A_{se} & 0 & A_{ss} \end{pmatrix} \begin{bmatrix} x_q \\ x_e \\ \tilde{x}_q \\ x_s \end{bmatrix} = \begin{bmatrix} r_q \\ r_e \\ 0 \\ r_s \end{bmatrix} \qquad (\text{Eq. 25})$$

This auxiliary matrix A* may be approximately factored as $$A^* \approx \begin{bmatrix} A_{qq} & A_{qe} & 0 & 0 \\ A_{eq} & A_{ee} & 0 & 0 \\ 0 & 0 & A_{qq} & A_{qs} \\ A_{sq} & A_{se} & A_{sq} & A_{ss} \end{bmatrix} \begin{bmatrix} I & 0 & -I & 0 \\ 0 & I & 0 & 0 \\ 0 & 0 & I & 0 \\ 0 & 0 & 0 & I \end{bmatrix} \qquad (\text{Eq. 26})$$

with error matrix $$E^* = \begin{bmatrix} 0 & 0 & 0 & 0 \\ 0 & 0 & A_{eq} & A_{es} \\ 0 & 0 & 0 & 0 \\ 0 & 0 & 0 & 0 \end{bmatrix} \qquad (\text{Eq. 27})$$

As shown below, applying such a methodology would converge more slowly and in most cases take more computer time than with using the present invention. An error analysis of an overlapping multiplicative Schwarz method in accordance with a preferred embodiment of the present invention is now described.

$\tilde{A}$ is partitioned into a block 4×4 form:

$$\tilde{A} = \begin{bmatrix} A_{ss} & A_{sq} & A_{sb} & 0 \\ A_{qb} & A_{qq} & A_{qb} & 0 \\ A_{bs} & A_{bq} & A_{bb} & A_{bi} \\ 0 & 0 & A_{ib} & A_{ii} \end{bmatrix} \qquad (\text{Eq. 28})$$

where $A_{ss}$ and $A_{qq}$ are the same as in Eq. 3. The block $A_{ee}$ in Eq. 3 has been further subdivided into two parts: explicit cells with at least one implicit neighboring cell ($A_{bb}$) and those with no implicit neighbors ($A_{ii}$).

For the overlapping two-block multiplicative Schwarz, define the prolongation operators $R_1$ and $R_2$ as:

$$R_1 = \begin{bmatrix} 0 & 0 & 0 \\ I_q & 0 & 0 \\ 0 & I_b & 0 \\ 0 & 0 & I_i \end{bmatrix} \quad \text{(Eq. 29)}$$

$$R_2 = \begin{bmatrix} I_s & 0 & 0 \\ 0 & I_q & 0 \\ 0 & 0 & I_b \\ 0 & 0 & 0 \end{bmatrix} \quad \text{(Eq. 30)}$$

where $I_s$, $I_q$, $I_b$ and $I_i$ are identity matrices of conformable order to the partitioning of $\tilde{A}$.

The following system with auxiliary matrix $A^*$ is equivalent to the original system:

$$\begin{bmatrix} A_{qq} & A_{qb} & 0 & -A_{qb} & -A_{qq} & 0 \\ A_{bq} & A_{bb} & A_{bi} & -A_{bb} & -A_{bq} & 0 \\ 0 & A_{ib} & A_{ii} & -A_{ib} & 0 & 0 \\ 0 & 0 & 0 & A_{bb} & A_{bq} & A_{bs} \\ 0 & 0 & 0 & A_{qb} & A_{qq} & A_{qs} \\ A_{sq} & A_{sb} & 0 & 0 & 0 & A_{ss} \end{bmatrix} \begin{bmatrix} x_q \\ x_b \\ x_i \\ \tilde{x}_b \\ \tilde{x}_q \\ x_s \end{bmatrix} = \begin{bmatrix} r_q \\ r_b \\ r_i \\ 0 \\ 0 \\ r_s \end{bmatrix} \quad \text{(Eq. 31)}$$

This auxiliary matrix may be approximately factored as:

$$A^* = L^* U^* + E^* \quad \text{(Eq. 32)}$$

where $$L^* = \begin{bmatrix} A_{qq} & A_{qb} & 0 & 0 & 0 & 0 \\ A_{bq} & A_{bb} & A_{bi} & 0 & 0 & 0 \\ 0 & A_{ib} & A_{ii} & 0 & 0 & 0 \\ 0 & 0 & 0 & A_{bb} & A_{bq} & A_{bs} \\ 0 & 0 & 0 & A_{qb} & A_{qq} & A_{qs} \\ A_{sq} & A_{sb} & 0 & A_{sb} & A_{sq} & A_{ss} \end{bmatrix} \quad \text{(Eq. 33)}$$

and $$U^* = \begin{bmatrix} I & 0 & 0 & 0 & -I & 0 \\ 0 & I & 0 & -I & 0 & 0 \\ 0 & 0 & I & 0 & 0 & 0 \\ 0 & 0 & 0 & I & 0 & 0 \\ 0 & 0 & 0 & 0 & I & 0 \\ 0 & 0 & 0 & 0 & 0 & I \end{bmatrix} \quad \text{(Eq. 34)}$$

and the error matrix is:

$$E^* = \begin{bmatrix} 0 & 0 & 0 & 0 & 0 & 0 \\ 0 & 0 & 0 & 0 & 0 & 0 \\ 0 & 0 & 0 & A_{ib} & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad \text{(Eq. 35)}$$

Thus with exact solution on both overlapping subspaces, the only residual error is associated with non-boundary explicit cells with explicit boundary cell neighbors.

These error terms are typically much smaller than the error terms in Eq. 27. Since the latter error terms have additional couplings with non-pressure variables. Note also that it is these pressure-to-non-pressure couplings that the IMPES reduction step attempts to reduce.

Although the foregoing is provided for purposes of illustrating, explaining and describing certain embodiments of the automated repetitive array microstructure defect inspection invention in particular detail, modifications and adaptations to the described methods, systems and other embodiments will be apparent to those skilled in the art and may be made without departing from the scope or spirit of the invention.

What is claimed is:

1. A computer implemented method for conducting a reservoir simulation, comprising:
   a. building, using a computer system, a reservoir model of a region of interest, by gridding the region of interest to generate a grid, the grid being comprised of one or more types of cells, the types of cells being distinguished by a number of unknown variables representing properties of the cells, with each cell having a common variable as an unknown variable;
   b. identifying, using the computer system, different cell types for the grid;
   c. constructing, using the computer system, a matrix of coefficients for the reservoir model based on the different cell types;
   d. at least partially decoupling, using the computer system, the common variable from other unknown variables in the matrix by using a reduction process to yield a reduced matrix;
   e. mathematically breaking up, using the computer system, the common variable and the other unknown variables in the reduced matrix into a number of subsets, wherein the number of subsets is determined based on the different cell types;
   f. applying, using the computer system, an overlapping multiplicative Schwartz procedure to the subsets of the reduced matrix to obtain a preconditioner;
   g. conducting, using the computer system, the reservoir simulation using the preconditioner; and
   h. generating, using the computer system, a plan based on the reservoir simulation, wherein the plan is implemented to improve production from a reservoir.

2. The method of claim 1, wherein the building step (a) results in a grid that is structured.

3. The method of claim 1, wherein the building step (a) results in a grid that is unstructured.

4. The method of claim 1 wherein the common variable is pressure.

5. The method of claim 1 wherein the common variable is temperature.

6. The method of claim 1, wherein the step (g) of conducting the reservoir simulation further comprises using the preconditioner to solve for the unknown variables.

7. The method of claim 6 wherein the common variable is pressure and wherein the matrix that is constructed in constructing step (c) is written in block form, based on the number of types of cells in the region of interest.

8. The method of claim 7, wherein for a single variable cell-type in the grid, the matrix requires one block row and one block column and wherein for each multi-variable cell-type in the grid, the matrix requires two additional block rows and two additional block columns.

9. The method of claim 8 wherein the step (d) of at least partially decoupling the common variable from the other unknown variables in the matrix is performed using a True-IMPES reduction.

10. The method of claim 8 wherein the step (d) of at least partially decoupling the common variable from the other unknown variables in the matrix is performed using a Quasi-IMPES reduction.

11. The method of claim 1, wherein the matrix that is constructed in constructing step (c) is written in block form, based on the different cell types in the region of interest.

12. The method of claim 11, wherein the grid has a single variable cell-type and the matrix requires one block row and one block column.

13. The method of claim 11, wherein for a single variable cell-type in the grid, the matrix requires one block row and one block column and wherein for each multi-variable cell-type in the grid, the matrix requires two additional block rows and two additional block columns.

14. The method of claim 1 wherein the step (d) of at least partially decoupling the common variable from the other unknown variables in the matrix is performed using a Quasi-IMPES reduction.

15. The method of claim 1 wherein the step (d) of at least partially decoupling the common variable from the other unknown variables in the matrix is performed using a True-IMPES reduction.

16. The method of claim 1 wherein step (e) of mathematically breaking up the common variable and the other unknown variables in the reduced matrix further comprises:

(e)(1) letting a total number of cells in the region of interest be $l_i$, letting N be a total number of unknown variables over all cells, letting k equal to a number of implicit cell types plus one, wherein an implicit cell comprises more than one unknown variable, with type-i cells having $n_i$ variables per cell, where i=1, 2, ..., k with type 1 cells being IMPES cells, if any;

(e)(2) setting i equal to one;

(e)(3) generating $l_i \times N$ restriction matrix $R_i$: where $l_i$ is the total number of cells and N is the total number of unknown variables, so that $R_i$ selects Set i variables;

(e)(4) setting i equal to i plus one;

(e)(5) generating a $l_i \times N$ restriction matrix $R_i$, which selects the Set i variables;

(e)(6) determining a padded restrictor $\hat{R}_i$;

(e)(7) if i is not equal to k, repeating steps (e)(4) through (e)(6) until i is equal to k.

17. The method of claim 16, wherein determining the padded restrictor step (e)(6) further comprises:

(e)(6)(i) letting $V_i = \{v_1^{(i)}, v_2^{(i)}, \ldots, v_{l_i}^{(i)}\}$, wherein $V_i$ represents a range of values of unknown variables for each of the type-i cells;

(e)(6)(ii) setting $r_{pq}^{(i)}$ equal to zero, p equal to a value in a range of 1, ..., $l_i$; and q equal to a value in a range of 1, ..., N, wherein $r_{pq}^{(i)}$ represents a type-i restriction cell;

(e)(6)(iii) letting p equal 1, wherein p represents a value in a range of the total number of cells;

(e)(6)(iv) setting q as the unknown variable number corresponding to cell number p in Set i ($v_p^{(i)} = x_q$), wherein $x_q$ represents the unknown variable and q represents a value in a range of the total number of unknown variables;

(e)(6)(v) setting $r_{pq}^{(i)}$ equal to one;

(e)(6)(vi) determining whether p is equal to $l_i$ and if not, setting p equal to p+1 and returning to step (e)(6)(iv), while if p is equal to $l_i$, setting $R_i$ equal to $[r_{pq}^{(i)}]_{p=1,\ldots,l_i, q=1,\ldots,N}$; and (e)(6)(vii) setting $\hat{P}_i$ equal to $R_i^T$, wherein $P_i$ is a transpose of the restriction matrix.

18. The method of claim 1 where step (f) of applying an overlapping multiplicative Schwartz procedure to the subsets of the reduced matrix to obtain a preconditioner further comprises:

(f)(1) setting i equal to one;

(f)(2) solving for the pressures $y_i$ in all cells, using the equation $\hat{A}_i y_i = \hat{R}_i r$, wherein $\hat{A}_i$ represents a padded Schwarz matrix, $\hat{P}_i$ represents the padded restrictor, and r represents a residual vector;

(f)(3) setting the approximate solution x to be $x = \hat{P}_i y_i$ and setting s equal to $r - \tilde{A}x$, wherein $\hat{P}_i$ represents a transpose of $\hat{P}_i$, s represents a temporary variable for storing intermediate residuals, $\tilde{A}$ represents a Schwarz matrix, and x represents the solution vector;

(f)(4) determining whether i is equal to k, and if it is not, (f)(4)(i) setting i equal to i plus 1;

(f)(4)(ii) solving for $y_i$, using $\hat{A}_i y_i = \hat{R}_i s$;

(f)(4)(iii) using the new value of $y_i$, calculate a new value of x equal to x plus $\hat{P}_i y_i$;

(f)(4)(iv) calculating a new value of s equal to s minus the product of $\tilde{A} \hat{P}_i y_i$; and (f)(4)(v) returning to determining step (f)(4) until i is equal to k.

19. The method of claim 1 wherein there are k−1 different cell types with m>1, wherein m represents the unknown variables of a cell of the reduced matix, and step (e) of mathematically breaking up the common variable and the other unknown variables in the reduced matrix in the reduced matrix further comprises:

(e)(1) for each cell of type $m_i > 1$, i=1 to k−1, forming a subsystem composed of type $m_i$ cells and their neighbors of different type, each subsystem having a constant block size;

(e)(2) for neighbors of type $n > m_i$, picking the common m variables when constructing the subsystems; and (e)(3) for n<m, picking all the n variables, and padding the system with m-n dummy variables.

20. A computer implemented method for conducting a reservoir simulation, using a reservoir model of a region of interest, the region of interest having been gridded to generate a grid, the grid of the region of interest being comprised of one or more types of cells, the types of cells being distinguished by a number of unknown variables representing properties of the cells, with each cell having a common variable as an unknown variable, comprising:

a) identifying, using the computer system, different cell types for the grid;

b) constructing, using the computer system, a matrix of coefficients for the reservoir model based on the different cell types;

c) at least partially decoupling, using the computer system, the common variable from other unknown variables in the matrix by using a reduction process to yield a reduced matrix;

d) mathematically breaking up, using the computer system, the common variable and the other unknown variables in the reduced matrix into a number of subsets, wherein the number of subsets is determined based on the different cell types, further comprising:

(d)(1) means for letting a total number of cells in the region of interest be $l_t$, letting N be a total number of unknown variables over all cells, letting k equal to a number of implicit cell types plus one, wherein an implicit cell comprises more than one unknown variable, with type-i cells having $n_i$ variables per cell, where i=1, 2, . . . , k with type 1 cells being IMPES cells, if any;

(d)(2) setting i equal to one;

(d)(3) generating $l_i \times N$ restriction matrix $R_i$: where $l_i$ is the total number of cells and N is the total number of unknown variables, so that $R_i$ selects Set i variables;

(d)(4) setting i equal to i plus one;

(d)(5) generating a $l_i \times N$ restriction matrix $R_i$, which selects the Set i variables;

(d)(6) determining the padded restrictor $\hat{R_i}$;

(d)(7) means for, if i is not equal to k, repeating steps (d)(4) through (d)(6) until i is equal to k;

e) applying, using the computer system, an overlapping multiplicative Schwartz procedure to the subsets of the reduced matrix to obtain a preconditioner;

f) using, using the computer system, the preconditioner of step(e) to solve for the unknown variables;

g) conducting, using the computer system, the reservoir simulation using the preconditioner; and h) generating, using the computer system, a plan based on the reservoir simulation, wherein the plan is implemented to improve production from a reservoir.

21. The method of claim 20 wherein the step (d)(6) determining the padded restrictor step further comprises:

(d)(6)(i) letting $V_i = \{v_1^{(i)}, v_2^{(i)}, \ldots, v_{l_i}^{(i)}\}$, wherein $V_i$ represents a range of values of unknown variables for each of the type-i cells;

(d)(6)(ii) setting $r_{pq}^{(i)}$ equal to zero, p equal to a value in a range of 1, . . . , $l_i$; and q equal to a value in a range of 1, . . . , N, wherein $r_{pq}^{(i)}$ represents a type-i restriction cell;

(d)(6)(iii) letting p equal 1, wherein p represents a value in a range of the total number of cells;

(d)(6)(iv) setting q as the unknown variable number corresponding to cell number p in Set i ($v_p^{(i)} = x_q$), wherein $x_q$ represents the unknown variable and q represents a value in a range of the total number of unknown variables;

(d)(6)(v) setting $r_{pq}^{(i)}$ equal to one;

(d)(6)(vi) determining whether p is equal to $l_i$ and if not, setting p equal to p+1 and returning to step (e)(6)(iv), while if p is equal to $l_i$, setting $R_i$ equal to $[r_{pq}^{(i)}]_{p=1, \ldots l_i, q=1, \ldots, N}$; and (d)(6)(vii) setting $P_i$ equal to $R^T_i$, wherein $P_i$ is a transpose of the restriction matrix.

22. The method of claim 21 wherein step (e) of applying an overlapping multiplicative Schwartz procedure to the subsets of the reduced matrix to obtain a preconditioner further comprises:

(e)(1) setting i equal to one;

(e)(2) solving for the pressures y in all cells, using the equation $\hat{A}_i y_i = \hat{R}_i r$, wherein $\hat{A}_i$ represents a padded Schwarz matrix, $\hat{A}_i$ represents the padded restrictor, and r represents a residual vector;

(e)(3) setting the approximate solution x to be $x = \hat{P}_i y_i$ and setting s equal to $r - \tilde{A}x$, wherein $\hat{P}_i$ represents a transpose of $\hat{P}_i$, s represents a temporary variable for storing intermediate residuals, $\tilde{A}$ represents a Schwarz matrix, and x represents the solution vector;

(e)(4) determining whether i is equal to k, and if it is not, (e)(4)(i) setting i equal to i plus 1;

(e)(4)(ii) solving for $y_i$, using $\hat{A}_i y_i = \hat{R}_i s$;

(e)(4)(iii) using the new value of $y_i$, calculate a new value of x equal to x plus $\hat{P}_i y_i$;

(e)(4)(iv) calculating a new value of s equal to s minus the product of $\tilde{A} \hat{P}_i y_i$; and (e)(4)(v) returning to determining step (e)(4) until i is equal to k.

23. The method of claim 20 wherein the common variable is pressure.

24. The method of claim 20 wherein the common variable is temperature.

25. The method of claim 20 wherein the step (d) of at least partially decoupling the common variable from the other unknown variables in the matrix is performed using a Quasi-IMPES reduction.

26. The method of claim 20 wherein the step (d) of at least partially decoupling the common variable from the other unknown variables in the matrix is performed using a True-IMPES reduction.

27. A program storage device readable by a machine, tangibly embodying a program of instructions executable by the machine to perform method steps for conducting a reservoir simulation using a reservoir model wherein a region of interest has been gridded, interest to generate a grid, the grid of the region of interest being comprised of one or more types of cells, the types of cells being distinguished by a number of unknown variables representing properties of the cells, with each cell having a common variable as an unknown variable, said storage device comprising instructions for:

a) identifying different cell types for the grid;

b) constructing a matrix of coefficients for the reservoir model based on the different cell types;

c) at least partially decoupling the common variable from other unknown variables in the matrix by using a reduction process to yield a reduced matrix;

d) mathematically breaking up the common variable and the other unknown variables in the reduced matrix into a number of subsets, wherein the number of subsets is determined based on the different cell types;

e) applying an overlapping multiplicative Schwartz procedure to the subsets of the reduced matrix to obtain a preconditioner;

f) using the preconditioner to solve for the unknown variables;

g) conducting the reservoir simulation using the preconditioner; and h) generating a plan based on the reservoir simulation, wherein the plan is implemented to improve production from a reservoir.

28. The program storage device of claim 27, wherein the grid is structured.

29. The program storage device of claim 27, wherein the grid is unstructured.

30. The program storage device of claim 27, wherein the common variable is pressure.

31. The program storage device of claim 27, wherein the common variable is temperature.

32. The program storage device of claim 27, wherein the matrix that is constructed in constructing step (b) is written in block form, based on the number of types of cells in the region of interest.

33. The program storage device of claim 27, wherein the grid has a single variable cell-type and the matrix requires one block row and one block column.

34. The program storage device of claim 33, wherein for a single variable cell-type in the grid, the matrix requires one block row and one block column and wherein for each multi-variable cell-type in the grid, the matrix requires two additional block rows and two additional block columns.

35. The program storage device of claim 27, wherein the step (c) of at least partially decoupling the common variable from the other unknown variables in the matrix is performed using a Quasi-IMPES reduction.

36. The program storage device of claim 27, wherein the step (c) of at least partially decoupling the common variable from the other unknown variables in the matrix is performed using a True-IMPES reduction.

37. The program storage device of claim 27, wherein step (d) of mathematically breaking up the common variable and the other unknown variables in the reduced matrix further comprises:
- (d)(1) letting a total number of cells in the region of interest be $l_t$, letting N be a total number of unknown variables over all cells, letting k equal to a number of implicit cell types plus one, wherein an implicit cell comprises more than one unknown variable, with type-i cells having $n_i$ variables per cell, where i=1, 2, ..., k with type 1 cells being IMPES cells, if any;
- (d)(2) setting i equal to one;
- (d)(3) generating $l_i \times N$ restriction matrix $R_i$: where $l_i$ is the total number of cells and N is the total number of unknown variables, so that $R_i$ selects Set i variables;
- (d)(4) setting i equal to i plus one;
- (d)(5) generating a $l_i \times N$ restriction matrix $R_i$, which selects the Set i variables;
- (d)(6) determining the padded restrictor $\hat{R}_i$;
- (d)(7) if i is not equal to k, repeating steps (d)(4) through (d)(6) until i is equal to k.

38. The program storage device of claim 27, wherein step (e) of applying an overlapping multiplicative Schwartz procedure to the subsets of the reduced matrix to obtain a preconditioner further comprises:
- (e)(1) setting i equal to one;
- (e)(2) solving for the pressures $y_i$ in all cells, using the equation $\hat{A}_i y_i = \hat{R}_i r$, wherein $\hat{A}_i$ represents a padded Schwarz matrix, $\hat{P}_i$ represents the padded restrictor, and r represents a residual vector;
- (e)(3) setting the approximate solution x to be $x = \hat{P}_i y_i$ and setting s equal to $r - \tilde{A}x$, wherein $\hat{P}_i$ represents a transpose of $\hat{P}_i$, s represents a temporary variable for storing intermediate residuals, $\tilde{A}$ represents a Schwarz matrix, and x represents the solution vector;
- (e)(4) determining whether i is equal to k, and if it is not,
  - (e)(4)(i) setting i equal to i plus 1;
  - (e)(4)(ii) solving for $y_i$, using $\hat{A}_i y_i = \hat{R}_i s$;
  - (e)(4)(iii) using the new value of $y_i$, calculate a new value of x equal to x plus $\hat{P}_i y_i$;
  - (e)(4)(iv) calculating a new value of s equal to s minus the product of $\tilde{A}\hat{P}_i y_i$; and
  - (e)(4)(v) returning to determining step (e)(4) until i is equal to k.

39. A computing system responsive to input data, adapted for solving a system of nonlinear equations that represent a particular entity, said simulation apparatus generating a set of simulation results when said system of nonlinear equations are solved, said set of simulation results including one or more parameters which characterize said particular entity, wherein a representation of the entity has been gridded to generate a grid, the grid of the representation of the entity being comprised of one or more types of cells, the types of cells being distinguished by a number of unknown variables representing properties of the cells, but with each cell having a common variable as an unknown variable, comprising:
- one or more processors and
- a memory storing instructions for:
  - a) a first means for identifying different cell types for the grid;
  - b) a second means for constructing a matrix of coefficients for a reservoir model based on the different cell types;
  - c) a third means for at least partially decoupling the common variable from other unknown variables in the matrix by using a reduction process to yield a reduced matrix;
  - d) a fourth means for mathematically breaking up the common variable and the other unknown variables in the reduced matrix into a number of subsets, wherein the number of subsets is determined based on the different cell types;
  - e) a fifth means for applying an overlapping multiplicative Schwartz procedure to the subsets of the reduced matrix to obtain a preconditioner;
  - f) a sixth means for using the preconditioner to solve for the unknown variables;
  - g) a seventh means for conducting the reservoir simulation using the preconditioner; and
  - h) an eighth means for generating a plan based on the reservoir simulation, wherein the plan is implemented to improve production from a reservoir.

40. The computing system of claim 39, wherein the grid is structured.

41. The computing system of claim 39, wherein the grid is unstructured.

42. The computing system of claim 39, wherein the common variable is pressure.

43. The computing system of claim 39, wherein, wherein the matrix that is constructed by constructing the second means (b) is written in block form, based on the number of types of cells in the region of interest.

44. The computing system of claim 43, wherein the grid has a single variable cell-type and the matrix requires one block row and one block column.

45. The computing system of claim 44, wherein for a single variable cell-type in the grid, the matrix requires one block row and one block column and wherein for each multi-variable cell-type in the grid, the matrix requires two additional block rows and two additional block columns.

46. The computing system of claim 39, wherein the third means (c) of at least partially decoupling the common variable from the other unknown variables in the matrix includes means for using a Quasi-IMPES reduction.

47. The computing system of claim 39, wherein the third means (c) of at least partially decoupling the common variable from the other unknown variables in the matrix includes means for using a True-IMPES reduction.

48. The computing system of claim 39, wherein the fourth means (d) for mathematically breaking up the common variable and the other unknown variables in the reduced matrix further comprises:
- (d)(1) means for letting a total number of cells in the region of interest be $l_i$, letting N be a total number of unknown variables over all cells, letting k equal to a number of implicit cell types plus one, wherein an implicit cell comprises more than one unknown variable, with type-i cells having $n_i$ variables per cell, where i=1, 2, ..., k with type 1 cells being IMPES cells, if any;

(d)(2) means for setting i equal to one;

(d)(3) means for generating $l_i \times N$ restriction matrix $R_i$: where $l_i$ is the total number of cells and N is the total number of unknown variables, so that $R_i$ selects Set i variables;

(d)(4) means for setting i equal to i plus one;

(d)(5) means for generating a $l_i \times N$ restriction matrix $R_i$, which selects the Set i variables;

(d)(6) means for determining the padded restrictor $\hat{R}_i$;

(d)(7) means for, if i is not equal to k, repeating steps (d)(4) through (d)(6) until i is equal to k.

49. The computing system of claim 39, wherein fifth means (e) for applying an overlapping multiplicative Schwartz procedure to the subsets of the reduced matrix to obtain a preconditioner further comprises:

(e)(1) means for setting i equal to one;

(e)(2) means for solving for the pressures y in all cells, using the equation $\hat{A}_i y_i = \hat{R}_i r$, wherein $\hat{A}_i$ represents a padded Schwarz matrix, $\hat{P}_i$ represents the padded restrictor, and r represents a residual vector;

(e)(3) setting the approximate solution x to be $x = \hat{P}_i y_i$ and setting s equal to $r - \tilde{A}x$, wherein $\hat{P}_i$ represents a transpose of $\hat{A}_i$, s represents a temporary variable for storing intermediate residuals, $\tilde{A}$ represents a Schwarz matrix, and x represents the solution vector;

(e)(4) means for determining whether i is equal to k, and if it is not, (e)(4)(i) means for setting i equal to i plus 1;

(e)(4)(ii) solving for $y_i$, using $\hat{A}_i y_i = \hat{R}_i s$;

(e)(4)(iii) using the new value of $y_i$, calculate a new value of x equal to x plus $\hat{P}_i y_i$;

(e)(4)(iv) calculating a new value of s equal to s minus the product of $\tilde{A} \hat{P}_i y_i$; and (e)(4)(v) means for returning to determining step (e)(4) until i is equal to k.

50. A computing system responsive to a set of input data for displaying a gridded representation of an earth formation comprising a grid comprised of a plurality of cells and a plurality of simulation results associated with, respectively, with the plurality of cells, with types of cells of the grid being distinguished by a number of unknown variables representing properties of the cells, but with each cell having a common variable as an unknown variable, comprising:

one or more processors and a memory storing instructions for:

a) a first means for identifying different cell types for the grid;

b) a second means for constructing an overall matrix of coefficients for a reservoir model based on the different cell types;

c) a third means for at least partially decoupling the common variable from other unknown variables in the matrix by using a reduction process to yield a reduced matrix;

d) a fourth means for mathematically breaking up the common variable and the other unknown variables in the reduced matrix into a number of subsets, wherein the number of subsets is determined based on the different cell types;

e) a fifth means for applying an overlapping multiplicative Schwartz procedure to the subsets of the reduced matrix to obtain a preconditioner;

f) a sixth means for using the preconditioner to solve for the unknown variables;

g) a seventh means for conducting the reservoir simulation using the preconditioner; and h) an eighth means for generating a plan based on the reservoir simulation, wherein the plan is implemented to improve production from a reservoir.

51. The computing system of claim 50 wherein the grid is unstructured, the common variable is pressure, and wherein the fourth means (d) for mathematically breaking up the common variable and the other unknown variables in the reduced matrix farther comprises:

(d)(1) means for letting a total number of cells in the region of interest be $l_i$, letting N be a total number of unknown variables over all cells, letting k equal to a number of implicit cell types plus one, wherein an implicit cell comprises more than one unknown variable, with type-i cells having $n_i$ variables per cell, where i=1, 2, ..., k with type 1 cells being IMPES cells, if any;

(d)(2) means for setting i equal to one;

(d)(3) means for generating $l_i \times N$ restriction matrix $R_i$: where $l_i$ is the total number of cells and N is the total number of unknown variables, so that $R_i$ selects Set i variables;

(d)(4) means for setting i equal to i plus one;

(d)(5) means for generating $l_i \times N$ restriction matrix $R_i$, which selects the Set i variables;

(d)(6) means for determining the padded restrictor $\hat{R}_i$;

(d)(7) means for, if i is not equal to k, repeating steps (d)(4) through (d)(6) until i is equal to k.

52. The computing system of claim 51 wherein the fifth means (e) for applying an overlapping multiplicative Schwartz procedure to the subsets of the reduced matrix to obtain a preconditioner further comprises:

(e)(1) means for setting i equal to one;

(e)(2) means for solving for the pressures y in all cells, using the equation $\hat{A}_i y_i = \hat{R}_i r$, wherein $\hat{A}_i$ represents a padded Schwarz matrix, $\hat{R}_i$ represents the padded restrictor, and r represents a residual vector;

(e)(3) means for setting the approximate solution x to be $x = \hat{P}_i y_i$ and setting s equal to $r - \tilde{A}x$, wherein $\hat{P}_i$ represents a transpose of $\hat{R}_i$, s represents a temporary variable for storing intermediate residuals, $\tilde{A}$ represents a Schwarz matrix, and x represents the solution vector;

(e)(4) means for determining whether i is equal to k, and if it is not, (e)(4)(i) means for setting i equal to i plus 1;

(e)(4)(ii) means for solving for $y_i$, using $\hat{A}_i y_i = \hat{R}_i s$;

(e)(4)(iii) using the new value of $y_i$, calculate a new value of x equal to x plus $\hat{P}_i y_i$;

(e)(4)(iv) means for calculating a new value of s equal to s minus the product of $\tilde{A} \hat{P}_i y_i$; and (e)(4)(v) means for returning to determining step (e)(4) until i is equal to k.

* * * * *

UNITED STATES PATENT AND TRADEMARK OFFICE
CERTIFICATE OF CORRECTION

PATENT NO. : 7,516,056 B2
APPLICATION NO. : 11/410622
DATED : April 7, 2009
INVENTOR(S) : John Wallis, Hamdi A. Tchelepi and Hui Cao Page 1 of 1

It is certified that error appears in the above-identified patent and that said Letters Patent is hereby corrected as shown below:

Title Page,
Item (73) Assignees: should read: Schlumberger Technology Corporation, Houston, TX (US); Chevron U.S.A. Inc., San Ramon, CA (US)

Signed and Sealed this

Thirteenth Day of July, 2010

David J. Kappos
*Director of the United States Patent and Trademark Office*